US012720500B2

(12) United States Patent
Zeng et al.

(10) Patent No.: US 12,720,500 B2
(45) Date of Patent: Aug. 25, 2026

(54) TRANSMISSION CONFIGURATION METHOD AND APPARATUS, AND TERMINAL

(71) Applicant: VIVO MOBILE COMMUNICATION CO., LTD., Chang'an Dongguan (CN)

(72) Inventors: Yu Zeng, Chang'an Dongguan (CN); Siqi Liu, Chang'an Dongguan (CN); Zichao Ji, Chang'an Dongguan (CN); Huan Wang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 549 days.

(21) Appl. No.: 18/350,531

(22) Filed: Jul. 11, 2023

(65) Prior Publication Data

US 2023/0354271 A1 Nov. 2, 2023

Related U.S. Application Data

(63) Continuation of application No. PCT/CN2022/071324, filed on Jan. 11, 2022.

(30) Foreign Application Priority Data

Jan. 15, 2021 (CN) ......................... 202110057838.4

(51) Int. Cl.
*H04W 72/02* (2009.01)
*H04L 1/1812* (2023.01)
*H04W 72/25* (2023.01)

(52) U.S. Cl.
CPC ........... *H04W 72/02* (2013.01); *H04L 1/1812* (2013.01); *H04W 72/25* (2023.01)

(58) Field of Classification Search
CPC . H04W 72/02; H04W 72/25; H04W 52/0248; H04W 72/1215; H04W 52/0245;
(Continued)

(56) References Cited

U.S. PATENT DOCUMENTS

2020/0099479 A1* 3/2020 Park ........................ H04W 4/70
2020/0344722 A1* 10/2020 He ........................ H04L 5/0055
(Continued)

FOREIGN PATENT DOCUMENTS

WO 2020/057489 A1 3/2020

OTHER PUBLICATIONS

Vivo., "Discussion on sidelink DRX," 3GPP TSG-RAN WG1 Meeting #103-e, R1-2007690, (Nov. 13, 2020).
(Continued)

*Primary Examiner* — Abdullahi Ahmed
(74) *Attorney, Agent, or Firm* — Price Heneveld LLP

(57) ABSTRACT

Disclosed are a transmission configuration method and apparatus, and a terminal, which belong to the field of communications. The transmission configuration method comprises: a first terminal executing a first operation, wherein the first operation comprises one of the following: configuring a configuration parameter of a target resource in a first mechanism of the first terminal, such that the target resource in the first mechanism of the first terminal is at least partially overlapped with an active time of a second mechanism of a second terminal; selecting, within a first time, a resource for transmission; and configuring a configuration parameter of a second mechanism of the first terminal, such that an active time of the second mechanism of the first terminal is at least partially overlapped with a target resource in a first mechanism of a third terminal.

20 Claims, 7 Drawing Sheets

(58) Field of Classification Search
CPC ....... H04W 4/40; H04W 72/40; H04W 92/18; H04W 76/28; H04W 4/70; H04W 76/14; H04W 72/0446; H04W 52/0216; H04W 24/08; H04W 72/542; H04W 72/563; H04L 1/1812; Y02D 30/70
See application file for complete search history.

(56) References Cited

U.S. PATENT DOCUMENTS

2022/0046745 A1* 2/2022 Ryu .................... H04W 52/028
2023/0145687 A1* 5/2023 Turtinen ............... H04L 1/1851 370/329
2023/0300870 A1* 9/2023 Zhou ..................... H04W 76/28 370/216
2023/0363050 A1* 11/2023 Zeng ................. H04W 52/0216
2023/0403681 A1* 12/2023 Wen .................. H04W 52/0216
2024/0049342 A1* 2/2024 Yang ................. H04W 52/0235
2024/0292324 A1* 8/2024 Maamari ........... H04W 52/0229
2024/0306246 A1* 9/2024 Zhang ............... H04W 52/0229

OTHER PUBLICATIONS

Fujitsu., "Considerations on partial sensing in NR V2X," 3GPP TSG RAN WG1 Meeting #103-E, R1-2007787, pp. 1-18, (Nov. 13, 2020).
Ericsson., "Resource allocation mechanisms for power saving," 3GPP TSG-RAN WG1 Meeting #103-e, R1-2009072, (Nov. 13, 2020).
Vivo., "Resource allocation for sidelink power saving," 3GPP TSG RAN WG1 #104-e, R1-2101790, (Feb. 5, 2021).
International Search Report and Written Opinion of the International Searching Authority dated Apr. 8, 2022 as received in Application No. PCT/CN2022/071324.
LG Electronics, "Discussion on Physical Layer Design Considering Sidelink DRX Operation," 3GPP TSG RAN WG1 #103-e, R1-2007897, e-Meeting, Oct. 26-Nov. 13, 2020.
Vivo, "Resource Allocation for Sidelink Power Saving," 3GPP TSG RAN WG1 #103-e, R1-2007688, e-Meeting, Oct. 26-Nov. 13, 2020.
Vivo, "SL DRX for Groupcast Broadcast and Unicast," 3GPP TSG-RAN WG2 Meeting #112 electronic, R2-2009833, e-Meeting, Nov. 2-13, 2020.

* cited by examiner

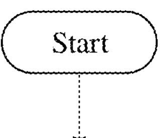

A first terminal performs a first operation, where the first operation includes one of the following: configuring a configuration parameter of a target resource of a first mechanism of the first terminal such that the target resource of the first mechanism of the first terminal at least partially overlaps an active time of a second mechanism of a second terminal;
selecting a resource for transmission from a first time; and
configuring a configuration parameter for a second mechanism of the first terminal such that an active time of the second mechanism of the first terminal at least partially overlaps a target resource of a first mechanism of a third terminal

602

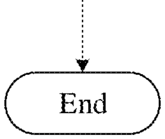

FIG. 6

TRANSMISSION CONFIGURATION METHOD AND APPARATUS, AND TERMINAL

CROSS-REFERENCE TO RELATED APPLICATIONS

This application is a continuation application of PCT International Application No. PCT/CN2022/071324 filed on Jan. 11, 2022, which claims priority to Chinese Patent Application No. 202110057838.4, filed in China on Jan. 15, 2021, which is incorporated herein by reference in its entirety.

TECHNICAL FIELD

This application pertains to the field of communication technologies and specifically relates to a transmission configuration method and apparatus, and a terminal.

BACKGROUND

Currently, sidelink (SL) discontinuous reception (DRX) is introduced to new radio (NR) sidelink for power saving. However, the following problems are present during communication between terminals: a first terminal may send a packet for initial transmission and/or retransmission within a DRX inactive time of a second terminal, and because the second terminal is in the DRX inactive time, that is, a DRX active time and a sensing time (for example, sensing window) are not aligned between the terminals, the second terminal may be incapable of monitoring/receiving/demodulating the corresponding incoming packet, resulting in low reliability of sidelink services and high power consumption.

SUMMARY

According to a first aspect, a transmission configuration method is provided, including: performing, by a first terminal, a first operation; where the first operation includes one of the following: configuring a configuration parameter of a target resource of a first mechanism of the first terminal such that the target resource of the first mechanism of the first terminal at least partially overlaps an active time of a second mechanism of a second terminal; selecting a resource for transmission from a first time; and configuring a configuration parameter for a second mechanism of the first terminal such that an active time of the second mechanism of the first terminal at least partially overlaps a target resource of a first mechanism of a third terminal; where the target resource includes at least one of the following: a resource selection time and a selectable range of the resource selection time; and the second mechanism includes the active time and an inactive time.

According to a second aspect, a transmission configuration apparatus is provided, applied to a first terminal and including a first execution module configured to perform a first operation; where the first operation includes one of the following: configuring a configuration parameter of a target resource of a first mechanism of the first terminal such that the target resource of the first mechanism of the first terminal at least partially overlaps an active time of a second mechanism of a second terminal; selecting a resource for transmission from a first time; and configuring a configuration parameter for a second mechanism of the first terminal such that an active time of the second mechanism of the first terminal at least partially overlaps a target resource of a first mechanism of a third terminal; where the target resource includes at least one of the following: a resource selection time and a selectable range of the resource selection time; and the second mechanism includes the active time and an inactive time.

According to a third aspect, a terminal is provided, where the terminal includes a processor, a memory, and a program or instructions stored in the memory and capable of running on the processor, and when the program or instructions are executed by the processor, the steps of the method according to the first aspect are implemented.

According to a fourth aspect, a readable storage medium is provided, where the readable storage medium stores a program or instructions, and when the program or instructions are executed by a processor, the steps of the method according to the first aspect are implemented.

According to a fifth aspect, a chip is provided, where the chip includes a processor and a communication interface, the communication interface is coupled to the processor, and the processor is configured to run a program or instructions of a network-side device to implement the method according to the first aspect.

According to a sixth aspect, a computer program product is provided, where the computer program product is stored in a non-volatile storage medium, and the computer program product is executed by at least one processor so as to implement the steps of the method according to the first aspect.

In the embodiments of this application, the first terminal may configure the configuration parameter of the target resource of the first mechanism of the first terminal such that the target resource of the first mechanism of the first terminal at least partially overlaps the active time of the second mechanism of the second terminal; the first terminal may further configure the configuration parameter for the second mechanism of the first terminal such that the active time of the second mechanism of the first terminal at least partially overlaps the target resource of the first mechanism of the third terminal; and the first terminal selects the resource for transmission from the first time. This enables data or packets sent by the first terminal to arrive within active times of terminals communicating with the first terminal, and specifies an operation of the first terminal for a case that data or packets sent by the first terminal do not arrive within active times of terminals communicating with the first terminal. This guarantees reliability of sidelink services while achieving energy saving, and thus solves the problems of low reliability of sidelink services and high power consumption due to failure in processing transmissions or packets located at some specific times because DRX active times and sensing times are not aligned between terminals.

BRIEF DESCRIPTION OF DRAWINGS

FIG. 6 is a flowchart of a transmission configuration method according to an embodiment of this application;

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that the data used in this way are interchangeable in appropriate circumstances such that the embodiments of this application can be implemented in other orders than the order illustrated or described herein. In addition, objects distinguished by "first" and "second" are generally of a same type, and the quantities of the objects are not limited. For example, there may be one or more first objects. In addition, in this specification and claims, "and/or" indicates at least one of the connected objects, and the character "/" generally indicates an "or" relationship between the contextually associated objects.

It is worth noting that the technologies described in the embodiments of this application are not limited to long term evolution (LTE)/LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for illustration purposes, and NR terms are used in most of the following descriptions, although these technologies may also be applied to other applications than an NR system application, for example, the 6th generation (6G) communication system.

Figure 1:
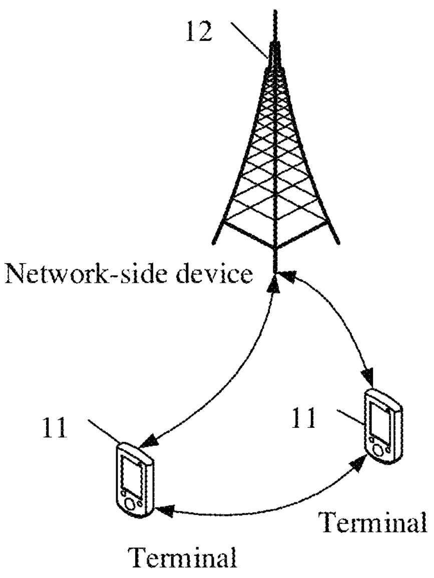
FIG. 1 is a block diagram of a wireless communication system to which the embodiments of this application are applicable.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, and the like. It should be noted that the terminal 11 is not limited to any particular type in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

Related terms in the embodiments of this application are first described.

I. Discontinuous Reception of LTE and NR Uu Interfaces

Figure 2:
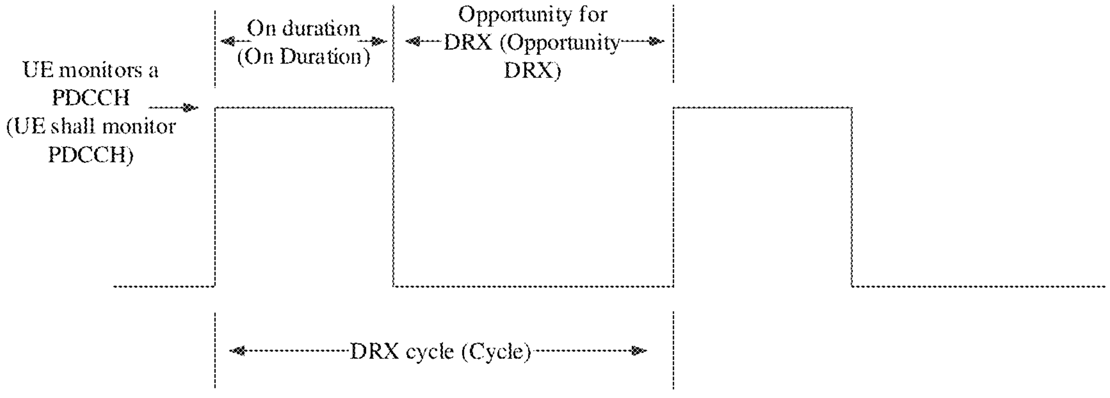
FIG. 2 is a schematic diagram of a DRX cycle according to an embodiment of this application.

A DRX mechanism is introduced to both LTE and NR, and DRX on and DRX off duration is configured to implement power saving for user equipment (UE). As shown in FIG. 2, an on duration time is a DRX on time, and if no scheduling is performed during the on duration time, the UE enters an off time of a DRX cycle.

During configuration of DRX, parameters such as onDurationTimer (on duration timer), drx-InactivityTimer (inactivity timer), drx-RetransmissionTimer (retransmission timer), and longDRX-CycleStartOffset are usually configured.

After DRX is configured for the UE, if decoding of transmitted or received data fails, the UE needs to enter an active time to monitor a control channel and wait for retransmission scheduled by a network. During the on duration time, if the UE is scheduled in a slot and receives data, it is likely to continue to be scheduled in next several slots. Therefore, a timer drx-InactivityTimer is started or restarted whenever the UE is scheduled to perform initial data transmission, and the UE remains in an active state until the timer expires.

For downlink data reception, after receiving a downlink data transmission indicated by a physical downlink control channel (PDCCH) and feeding back hybrid automatic repeat request (HARQ) information, the UE starts a downlink round trip time timer (HARQ RTT Timer) for a corresponding HARQ process, where RTT (Round Trip Time) is round trip time latency. If the HARQ RTT timer expires and data of the HARQ process is not successfully decoded, the UE starts a retransmission timer (drx-RetransmissionTimer), monitors the PDCCH, and waits for transmission.

For uplink data transmission, after receiving uplink data transmission that is indicated by the PDCCH, the UE starts an uplink round trip time timer HARQ RTT Timer for the corresponding HARQ process. After the HARQ RTT timer expires, the UE starts a retransmission timer (drx-ULRetransmissionTimer), enters an active state to monitor the PDCCH, and waits for transmission scheduled by the network.

II. LTE Sidelink SL Sensing

A basic working principle of the LTE sidelink sensing is as follows:

performing measurement in a sensing window, and performing scheduling assignment (SA) demodulation and interference measurement within each monitoring transmission time interval (TTI).

Figure 3:
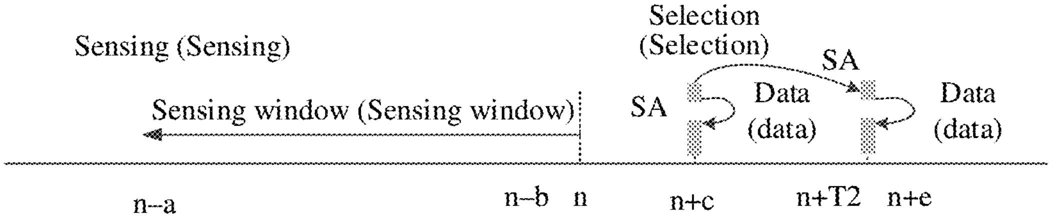
FIG. 3 is a schematic diagram of LTE sidelink sensing according to an embodiment of this application.

Based on FIG. 3, UE performs resource selection according to the following steps.

Step 1. Exclude resources for data transmission by the UE.

Step 2. A terminal demodulates a received SA to obtain resources reserved by another UE, so as to exclude the resources reserved by another UE.

Step 3. Perform energy monitoring within a sensing window by measuring a reference signal strength indication (RSSI), and then based on a measurement result, exclude resources with great interference.

Step 4. Randomly select a subframe from the 20% resources with least interference within a selection window, so as to implement periodic resource reservation.

III. Partial Sensing in LTE Sidelink (Partial Sensing in LTE SL)

Partial sensing in LTE V2X is mainly designed for power saving to support P2V communication. PUE supports two modes of resource selection. One is random resource selection; and the other is that partial sensing is first performed, and a resource is selected based on a partial sensing result, to implement semi-persistent resource reservation. Which mode to be selected by the PUE is configured by RRC, and when the RRC configures two modes of resource selection being supported, the PUE determines a resource selection manner to be used.

Based on FIG. 4, a manner of partial sensing and resource selection by the terminal is as follows.

A PUE sensing window is window 1 within a range of [n-1000, n], where length Y and k are parameters configured by RRC, and a value range of k may be {1, 2, 3, . . . , 10}. Window 2 within a range of [n+T1, n+T2] is a PUE selection window configured by a higher layer. In the blue sensing window, the PUE monitors SCI sent by another terminal; and based on detected SCI and a reservation period, infers a resource reservation status of another terminal in window 2. Then, based on such information, the PUE can exclude resources not satisfying a condition from the selection window. At least 20% (20% of the window length Y) of the remaining resources is used as a candidate resource set and is reported to a MAC layer. The MAC layer randomly selects a resource from the candidate resource set as a candidate resource of the PUE. The PUE performs periodic reservation for the selected resource, and a reservation period is indicated in SCI.

IV. Random Selection in Sidelink (Random Selection in SL)

Figure 4:
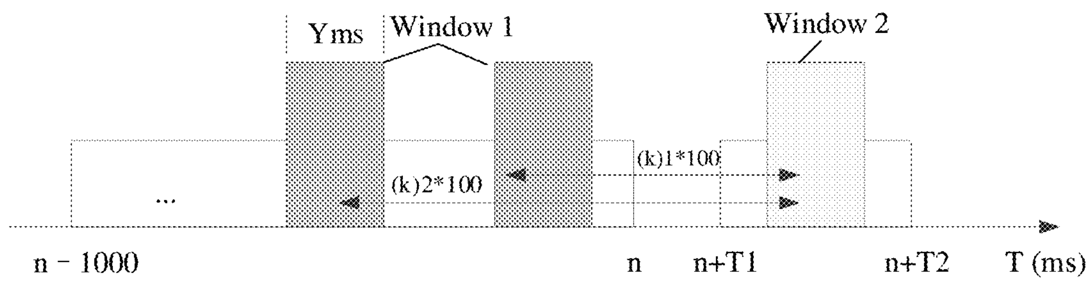
FIG. 4 is a schematic diagram of partial sensing in LTE according to an embodiment of this application.

If a user performs random selection, a resource is randomly selected from the selection window in FIG. 4 with no sensing required.

V. Sensing in New Radio Sidelink (Sensing in NR SL)

Resource allocation mode 2 supports sensing-based resource selection. It is similar to a sensing mechanism in LTE SL mode 4 in terms of principles. A specific operating manner is as follows: (1) After resource selection is triggered for TX UE, the TX UE determines a resource selection window. (2) Before resource selection, the UE needs to determine a candidate resource set (candidate resource set) for resource selection by comparing a reference signal received power (RSRP) measured on resources in a resource selection window with a corresponding RSRP threshold and then adding the resources into the candidate resource set if the RSRP is lower than the RSRP threshold. (3) After the resource set is determined, the UE randomly selects transmission resources from the candidate resource set. In addition, the UE may reserve transmission resources for a next transmission during a current transmission.

In Rel-16 NR SL, the TX UE performs resource reservation (the reservation includes periodic reservation and aperiodic reservation) for the resources allocated by the TX UE, and the reserved resources are used for future physical sidelink control channel (PSCCH) transmission or physical sidelink shared channel (PSSCH) transmission. The aperiodic reservation may be implemented through a time resource assignment field in SCI, and the reserved resources may be used at least for transmission of a same TB. The periodic reservation may be implemented through a resource reservation period field in the SCI, and the periodic resources reserved in a current period may be used for transmission of a next TB.

VI. SL Resource Preemption (Resource Pre-Emption) in NR SL

In resource allocation mode 2, a resource preemption mechanism is supported, and the mechanism is briefly described as follows: In a case that a resource that has been reserved or selected by one UE overlaps (partially overlaps) a resource reserved or selected by another UE with a higher-priority service, when a measured SL-RSRP value of the UE on related resources is greater than an associated SL-RSRP threshold, the UE triggers resource reselection. The service priority and the SL-RSRP threshold are determined based on a TB transmitted on the resource.

Figure 5:
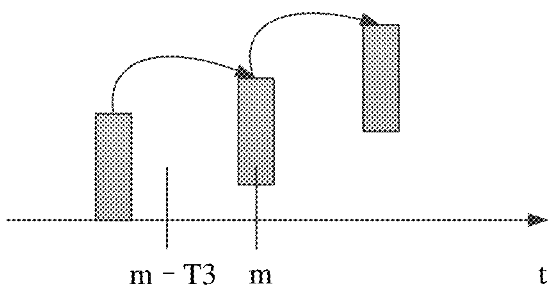
FIG. 5 is a schematic diagram of SL resource preemption according to an embodiment of this application.

As shown in FIG. 5, in order to determine whether a reserved or selected resource (PSCCH/PSSCH resource) is preempted, the UE performs reevaluation for resource selection at least at a time point 'm-T3', where the time point 'm' represents a time point at which the resource is located or a time point at which resource reservation information of the resource is transmitted, and T3 includes at least a processing duration for resource selection of the UE.

VII. Cast Type (Mandatory Type Conversion)

NR sidelink supports three transmission modes: broadcast, groupcast, and unicast. Groupcast of NR sidelink supports two use cases: connection-based groupcast and connectionless groupcast, where the connection-based groupcast means that a connection is established between UEs in groupcast, and the connectionless mode refers to a scenario in which a groupcast UE does not know other UEs in the same group and no connection is established therebetween. In case of groupcast, a plurality of receive ends support two mechanisms in performing HARQ feedback.

Mechanism 1 (NACK only feedback or connectionless (connection-less) mechanism): If data is received but cannot be decoded, NACK is fed back. No feedback is provided in other cases. In such case, if a receiving party receives no NACK, all the receive ends are considered to have successfully received and decoded the data. However, this mechanism has one disadvantage: a transmitting party may confuse successful reception of data with unsuccessful reception of SCI by the receiving party. To be specific, although the receiving party has failed to receive the SCI and data, the transmitting party assumes that the receiving party has successfully received the SCI and data. This manner is applicable to a connectionless groupcast scenario.

Mechanism 2 (ACK/NACK feedback or connection-based (connection-based) mechanism): If data is received but cannot be decoded, or SCI is received but no data is received, NACK is fed back; and if data is received and decoded correctly, ACK is fed back. In this case, if a transmitting party receives NACK transmitted from one transmit end user or receives no ACK or NACK, the transmitting party assumes that transmission to this terminal has failed; and if the transmitting party receives ACK transmitted from one transmit end, the transmitting party assumes that transmission to this terminal is successful. This manner is applicable to a connection-based groupcast scenario.

In addition, the following should also be noted.

(1) DRX active time (active time) is a time (active period) during which UE monitors/receives/demodulates/measures specific channel/signal/signaling, where the specific channel/signal/signaling may be at least one of the following: PSCCH, PSSCH, physical sidelink broadcast channel (PSBCH), physical sidelink feedback channel (Physical Sidelink Feedback Channel, PSFCH), sidelink control information (SCI), sidelink synchronization signal and PBCH block (S-SSB), and reference signal (RS), for example, including at least one of DRX on duration, inactivity timer duration, and retransmission timer duration.

(2) DRX inactive time is a time (that is, sleep period) during which UE does not monitor/receive/demodulate/measure specific channel/signal/signaling, where the specific channel/signal/signaling may be at least one of the following: PSCCH, PSSCH, PSBCH, PSFCH, SCI S-SSB, and RS, for example, including at least one of DRX off duration and RTT timer runtime.

(3) Sensing time may alternatively be replaced with the following other expressions in the art: sensing window, sensing time point, sensing range, sensing slot set, sensing resource set, and sensing sample.

(4) T1/ T2: T1 and T2 are respectively defined as distances from a time point n of triggering resource selection (reselection) to an upper boundary and to a lower boundary of a time range [n+T1, n+T2] including a resource selection time (that is, the resource selection time can be determined within this time range), values of which both depend on UE implementation and are required to satisfy $$0 \leq T_1 \leq T^{SL}_{proc,1}$$

and $T_{2min} \leq T_{2min}$ remaining packet budget (measured in slots); where $$T^{SL}_{proc,1}$$

is a preconfigured value, $T_2$ min is a value indicated by a higher layer, and when $T_2$ min>remaining packet budget, $T_2$=remaining packet budget.

The following describes in detail the transmission configuration method provided in the embodiments of this application through specific embodiments and application scenarios thereof with reference to the accompanying drawings.

As shown in FIG. 6, an embodiment of this application provides a transmission configuration method. The method includes the following steps.

Step 602. A first terminal performs a first operation, where the first operation includes one of the following:

configuring a configuration parameter of a target resource of a first mechanism of the first terminal such that the target resource of the first mechanism of the first terminal at least partially overlaps an active time of a second mechanism of a second terminal;

selecting a resource for transmission from a first time; and configuring a configuration parameter for a second mechanism of the first terminal such that an active time of the second mechanism of the first terminal at least partially overlaps a target resource of a first mechanism of a third terminal.

It should be noted that in this embodiment of this application, the target resource includes at least one of the following: a resource selection time and a selectable range of the resource selection time; and the second mechanism includes the active time and an inactive time.

According to step 602, the first terminal may configure the configuration parameter of the target resource of the first mechanism of the first terminal such that the target resource of the first mechanism of the first terminal at least partially overlaps the active time of the second mechanism of the second terminal, further configure the configuration parameter for the second mechanism of the first terminal such that the active time of the second mechanism of the first terminal at least partially overlaps the target resource of the first mechanism of the third terminal, and select the resource for transmission from the first time. This enables data or packets sent by the first terminal to arrive within active times of terminals communicating with the first terminal, that is, DRX active times and sensing times are aligned, and specifies an operation of the first terminal for a case that data or packets sent by the first terminal do not arrive within active times of terminals communicating with the first terminal. This guarantees reliability of sidelink services while achieving energy saving, and thus solves the problems of low reliability of sidelink services and high power consumption due to failure in processing transmissions or packets located at some specific times because DRX active times and sensing times are not aligned between terminals.

In this embodiment of this application, the second mechanism used in this embodiment of this application is optionally DRX. In view of this, in this embodiment of this application, the first terminal may obtain, in at least one of the following manners, a DRX configuration parameter for the second terminal or information that can be used for inferring a DRX configuration parameter for the second terminal: being configured by a network, being preconfigured, being indicated by another user, being prescribed by a protocol, being determined by the first terminal, and the like. The configuration parameter or information includes at least one of the following:

(1) DRX cycle.

(2) Length of a DRX active time.

(3) Length of a DRX inactive time.

(4) Starting time point, ending time point, or position of a DRX cycle.

It should be noted that the starting time point and position of the DRX cycle may be a starting time point and position of a most recent or current DRX cycle; and the ending time point and position of the DRX cycle may be an ending time point and position of a most recent or current DRX cycle.

(5) A starting/ending time point/position of a DRX active/inactive time.

It should be noted that the starting time point and position of the DRX active time may be a starting time point and position of a most recent or current DRX active time; the ending time point and position of the DRX active time may be an ending time point and position of a most recent or current DRX active time; the starting time point and position of the DRX inactive time may be a starting time point and position of a most recent or current DRX inactive time; and the ending time point and position of the DRX inactive time may be an ending time point and position of a most recent or current DRX inactive time.

In an optional implementation of this embodiment of this application, the configuring a configuration parameter of a target resource of a first mechanism of the first terminal in this embodiment of this application includes at least one of the following:

(1) configuring a starting point of the target resource to be no later than an ending point of the active time of the second mechanism of the second terminal, where the starting point of the target resource being no later than the ending point of the active time of the second mechanism of the second terminal includes at least one of the following: the starting point of the target resource being no later than the starting point of the active time of the second mechanism of the second terminal, and the starting point of the target resource being located between the starting point and ending point of the active time of the second mechanism of the second terminal; and (2) configuring the ending point of the target resource to be no earlier than a ending point of the active time of the second mechanism of the second terminal, where the starting point of the target resource being no earlier than the starting point of the active time of the second mechanism of the second terminal includes at least one of the following: the ending point of the target resource being no earlier than the ending point of the active time of the second mechanism of the second terminal, and the ending point of the target resource being located between the starting point and ending point of the active time of the second mechanism of the second terminal.

In an optional implementation of this embodiment of this application, the at least partially overlapping in step 602 in this embodiment of this application includes at least one of the following:

(1) length of an overlapping portion between the target resource and the active time of the second mechanism of the second terminal being greater than or equal to a first preset threshold;

(2) a ratio of the overlapping portion between the target resource and the active time of the second mechanism of the second terminal to the target resource being greater than or equal to a second preset threshold;

(3) a ratio of the overlapping portion between the target resource and the active time of the second mechanism of the second terminal to the active time being greater than or equal to a third preset threshold;

(4) a ratio of the overlapping portion between the target resource and the active time of the second mechanism of the second terminal to a period of the second mechanism being greater than or equal to a fourth preset threshold;

(5) length of an overlapping portion between the active time of the second mechanism of the first terminal and the target resource of the first mechanism of the third terminal being greater than or equal to a fifth preset threshold;

(6) a ratio of the overlapping portion between the active time of the second mechanism of the first terminal and the target resource of the first mechanism of the third terminal to the target resource being greater than or equal to a sixth preset threshold;

(7) a ratio of the overlapping portion between the active time of the second mechanism of the first terminal and the target resource of the first mechanism of the third terminal to the active time of the second mechanism of the first terminal being greater than or equal to a seventh preset threshold; and (8) a ratio of the overlapping portion between the active time of the second mechanism of the first terminal and the target resource of the first mechanism of the third terminal to a period of the second mechanism of the first terminal being greater than or equal to an eighth preset threshold.

It should be noted that in this embodiment of this application, the preset threshold may be correspondingly set depending on an actual situation and is not limited to a specific value in this application.

In an optional implementation of this embodiment of this application, a manner of selecting the resource for transmission from the first time in step 602 in this embodiment of this application includes at least one of the following:

(1) selecting, by the first terminal, a resource for initial transmission from a second time; and (2) selecting, by the first terminal, a resource for retransmission from a third time, where the second time is an overlapping portion between the target resource of the first mechanism of the first terminal and the active time of the second mechanism of the second terminal, and the third time is a non-overlapping portion between the target resource of the first mechanism of the first terminal and the active time of the second mechanism of the second terminal.

It should be noted that the first time includes the second time and the third time. Selecting the resource for transmission from the first time can ensure that the resource for initial transmission can fall within the active time of the second mechanism (DRX) of the peer terminal, thus ensuring reliability of services.

In another optional implementation of this embodiment of this application, the selecting a resource for transmission from a first time in step 602 in this embodiment of this application may further include at least one of the following:

(1) selecting, by the first terminal, a resource for initial transmission from a fourth time; and (2) selecting, by the first terminal, a resource for retransmission from a fifth time, where the fourth time is an interval from a starting point of the target resource to a first time point, and the fifth time is an interval from a second time point to an ending point of the target resource; the first time point being a result of an ending point of the active time of the second mechanism of the second terminal minus the product of L and a ninth preset threshold, the second time point being a result of the ending time point of the active time of the second mechanism of the second terminal minus the product of L and the ninth preset threshold and plus an offset value, and L being an integer greater than or equal to 1.

It should be noted that the first time includes the fourth time and the fifth time. Selecting the resource for transmission from the first time can ensure that the resource for initial transmission and the resource for retransmission can fall within the active time of the second mechanism (DRX) of the peer terminal, thus ensuring reliability of services. In addition, if a packet for initial transmission is successfully transmitted, there is no need for retransmission.

In addition, the offset value in this embodiment of this application may be a preset value or a value set as required and is not limited to a specific value in this application.

It should be noted that in this embodiment of this application, the second mechanism has a timer with a variable starting point or length.

That the second mechanism has a timer with a variable starting point or length includes at least one of the following: the starting point of the timer being related to a resource reselection time; an ending point of the timer being related to a resource reselection time; the starting point of the timer being related to a resource preemption time; the ending point of the timer being related to a resource preemption time; the starting point of the timer being related to a resource exclusion time; the ending point of the timer being related to a resource exclusion time; and the length of the timer being related to a ninth preset threshold.

It should be noted that in this embodiment of this application, the ninth preset threshold includes at least one of the following: a first interval between feedback information and corresponding data, a processing latency of the feedback information, and a sum of the first interval and the processing latency; where the feedback information is related to a transmission packet.

In this embodiment of this application, the processing latency includes at least one of the following: a maximum value of the processing latency and a minimum value of the processing latency.

The sum of the first interval and the processing latency includes at least one of the following: a sum of the first interval and a maximum value of the processing latency; a sum of the first interval and a minimum value of the processing latency; a minimum value of the sum of the first interval and the processing latency; and a maximum value of the sum of the first interval and the processing latency.

In this embodiment of this application, a manner of selecting the resource for initial transmission by the first terminal in this application is different from a manner of selecting the resource for retransmission by the first terminal. For example, the first terminal selects the resource for initial transmission in manner 1 and selects the resource for retransmission in manner 2, or the first terminal selects the resource for retransmission in manner 1 and selects the resource for initial transmission in manner 2.

In an optional implementation of this embodiment of this application, the steps of the method of this embodiment of this application may further include the following step.

Step 604. In a case that the target resource of the first terminal and the active time of the second mechanism of the second terminal do not overlap at all, the first terminal performs a second operation.

The second operation includes at least one of the following:

(1) Skipping transmission within the target resource.

(2) Skipping sensing within a sensing time corresponding to the target resource.

It should be noted that the target resource may be an inferred or virtual target resource. For example, the sensing time is a sensing time inferred by the first terminal based on a service period. However, because the sensing time and the active time of the peer terminal do not overlap at all, the first terminal transmits no packet at the sensing time (which can also be understood as that the concept of sensing time does not exist in this case), and/or the first terminal performs no sensing at the sensing time.

(3) Triggering resource selection.

(4) Triggering resource reselection.

(5) Triggering radio resource control RRC connection reconfiguration.

(6) Triggering RRC reconnection.

(7) Triggering a report operation.

The report operation may mean that the first terminal reports to a base station, a higher layer (for example, a V2X layer), or the peer terminal.

It can be seen that in the case that the target resource of the first terminal and the active time of the second mechanism of the second terminal do not overlap at all, it is specified that the first terminal can perform the second operation mentioned above, that is, skipping transmission within the target resource, and skipping sensing within the sensing time corresponding to the target resource, so as to perform another operation. This avoids that a terminal communicating with the first terminal cannot process a packet that is transmitted during the inactive time, and from another point of view, also guarantees reliability of sidelink services.

In an optional implementation of this embodiment of this application, a first object related to the first terminal is located within the active time of the second mechanism of the second terminal or a sensing time of the first mechanism of the third terminal, where the first object includes at least one of the following: the target resource of the first terminal, a triggering time point of resource selection and a starting point of the selectable range of the resource selection time, a triggering time point of resource reselection and a starting point of the selectable range of the resource selection time, a triggering time point of resource selection and an ending point of the selectable range of the resource selection time, a triggering time point of resource reselection and an ending point of the selectable range of the resource selection time, a candidate resource, first-stage sidelink control information SCI, and second-stage SCI.

In this embodiment of this application, the first-stage SCI is related to the second-stage SCI. It can be seen that transmission by the first terminal within the inactive time of the second mechanism of the second terminal is avoided because the first object is located within the active time of the second mechanism of the second terminal or the sensing time of the first mechanism of the third terminal.

In an optional implementation of this embodiment of this application, the method according to this embodiment of this application may further include the following step.

Step 606. The first terminal performs transmission within the active time of the second mechanism of the second terminal or within a sensing time of the first mechanism of the third terminal.

In another optional implementation of this embodiment of this application, the first terminal configures the configuration parameter for the second mechanism of the first terminal in at least one of the following manners such that the active time of the second mechanism of the first terminal at least partially overlaps the target resource of the first mechanism of the third terminal: being configured by a network-side device, being preconfigured, being indicated by another terminal, being prescribed by a protocol, and being determined by the first terminal.

In another optional implementation of this embodiment of this application, that the first terminal configures the configuration parameter for the second mechanism such that the active time of the second mechanism of the first terminal at least partially overlaps the target resource of the first mechanism of the third terminal includes at least one of the following:

(1) the first terminal configures the configuration parameter for the second mechanism by using first indication information such that the active time of the second mechanism of the first terminal at least partially overlaps the target resource of the first mechanism of the third terminal, where the first indication information is sent by the third terminal;

(2) the first terminal configures the configuration parameter for the second mechanism of the first terminal based on a received packet such that the active time of the second mechanism of the first terminal at least partially overlaps the target resource of the first mechanism of the third terminal; and (3) the first terminal notifies a model for the first mechanism of the first terminal to the third terminal.

It should be noted that in this embodiment of this application, after notifying the model for the first mechanism of the first terminal to the third terminal, the first terminal may further receive a model for a second mechanism of the third terminal that is transmitted by the third terminal and compatible with the model for the first mechanism of the first terminal.

The configuring, by the first terminal, the configuration parameter for the second mechanism by using first indication information described above includes at least one of the following:

(1) Setting, by the first terminal, a period of the second mechanism of the first terminal to a multiple or factor of a service period of the third terminal indicated by the first indication information.

In specific application scenarios, this may be that the first terminal indicates a period of a current service to the third terminal using indication information, and the third terminal sets the period of the second mechanism to a service period of the first terminal or a factor or multiple of the service period.

(2) Setting, by the first terminal, length of the active time of the second mechanism of the first terminal to length of a selectable range of a resource selection window. The first indication information is used to indicate at least one of the following: distance between a triggering time point of resource selection of the third terminal and a starting point of the selectable range of the resource selection time, distance between a triggering time point of resource reselection of the third terminal and the starting point of the selectable range of the resource selection time, distance between the triggering time point of resource selection of the third terminal and an ending point of the selectable range of the resource selection time, and distance between the triggering time point of resource reselection of the third terminal and the ending point of the selectable range of the resource selection time.

(3) Configuring, by the first terminal, the configuration parameter for the second mechanism of the first terminal according to configuration information of a second mechanism indicated by the first indication information, where the second mechanism is a second mechanism desired by the third terminal or a second mechanism coordinated with service of the third terminal. For example, the first terminal indicates, in indication information, a second mechanism configuration that is coordinated with service of the first terminal to the third terminal, and the third terminal sets, based on the second mechanism configuration, an overlapping portion between an active time of the second mechanism and the sensing time of the first terminal to be no less than a preset value.

In an optional implementation of this embodiment of this application, the first indication information in this embodiment of this application is further used to indicate at least one of the following information: whether to extend the active time of the second mechanism of the first terminal, whether to trigger a timer of the second mechanism of the first terminal, an extended amount of the active time of the second mechanism of the first terminal, and length of the timer of the second mechanism of the first terminal.

In an optional implementation of this embodiment of this application, the length of the timer of the second mechanism of the first terminal and/or an extended amount of the active time of the second mechanism of the first terminal may be obtained in at least one the following manners: being configured by a network, being preconfigured, being indicated by another device, being prescribed by a protocol, and being determined by the first terminal.

The configuring, by the first terminal, the configuration parameter for the second mechanism of the first terminal based on a received packet described above includes at least one of the following:

(1) Determining, by the first terminal based on a demodulation result of the received packet or HARQ-ACK information corresponding to the packet, whether to extend the active time of the second mechanism of the first terminal.

(2) Determining, by the first terminal based on the demodulation result of the received packet or the HARQ-ACK information corresponding to the packet, whether to trigger a timer of the second mechanism of the first terminal.

Optionally, in a case that the packet received by the first terminal at the active time of the second mechanism is unsuccessfully demodulated or the HARQ-ACK information corresponding to the packet is NACK, the active time of the current second mechanism is extended or the timer of the second mechanism is triggered. Alternatively, in a case that the packet received by the first terminal at the active time of the second mechanism is successfully demodulated or the HARQ-ACK information corresponding to the packet is ACK, the active time of the current second mechanism is not extended or the timer of the second mechanism is not triggered. Alternatively, in a case that HARQ-ACK information sent by the first terminal is NACK, the first terminal considers that the second terminal has extended the active time of the second mechanism or triggered the timer of the second mechanism.

(3) Determining, by the first terminal based on distance between a reception time of the packet and an ending point of the active time of the second mechanism of the first terminal, whether to extend the active time of the second mechanism of the first terminal.

In a case that distance between a time point at which the first terminal receives a packet during the active time of the second mechanism and an ending time point of the active time of the current second mechanism/a starting time point of the inactive time of the second mechanism is less than a preset value, the active time of the current second mechanism is extended/the timer of the second mechanism is triggered.

Optionally, in this embodiment of this application, the packet is a packet related to initial transmission or a packet related to retransmission. In addition, the preset value may be 32 slots.

(4) Determining, by the first terminal based on the distance between the reception time of the packet and the ending point of the active time of the second mechanism of the first terminal, whether to trigger the timer of the second mechanism of the first terminal.

(5) Determining, by the first terminal based on distance between the reception time of the packet and a starting point of the inactive time of the second mechanism of the first terminal, whether to extend the active time of the second mechanism of the first terminal.

(6) Determining, by the first terminal based on the distance between the reception time of the packet and the starting point of the inactive time of the second mechanism of the first terminal, whether to trigger the timer of the second mechanism of the first terminal.

(7) In a case that the first terminal discovers that a second object is located within the inactive time of the second mechanism of the first terminal, performing, by the first terminal, a first target operation.

(8) In a case that the first terminal discovers that the second object is located within the active time of the second mechanism of the first terminal, performing, by the first terminal, a second target operation.

It should be noted that in this embodiment of this application, the second object is a transmission or transmission resource desired by the first terminal. In addition, optionally, in this embodiment of this application, the second object is related to an aperiodic indication, and the aperiodic indication may be SCI for aperiodic reservation.

In this embodiment of this application, the extending the active time of the second mechanism of the first terminal in this embodiment of this application includes at least one of the following: starting extending the active time of the second mechanism of the first terminal at a reception time of second indication information, starting extending the active time of the second mechanism of the first terminal at the reception time of the packet, starting extending the active time of the second mechanism of the first terminal at a reception failure time of the packet, starting extending the active time of the second mechanism of the first terminal at a transmission failure time of the packet, and starting extending the active time of the second mechanism of the first terminal at a demodulation failure time of the packet.

It should be noted that the triggering the timer of the second mechanism of the first terminal in this embodiment of this application includes at least one of the following: starting triggering the timer of the second mechanism of the first terminal at the reception time of the second indication information, starting triggering the timer of the second mechanism of the first terminal at the reception time of the packet, starting triggering the timer of the second mechanism of the first terminal at the reception failure time of the packet, starting triggering the timer of the second mechanism of the first terminal at the transmission failure time of the packet, and starting triggering the timer of the second mechanism of the first terminal at the demodulation failure time of the packet.

In an optional implementation of this embodiment of this application, the determining, by the first terminal based on a demodulation result of the received packet or HARQ-ACK information corresponding to the packet, whether to extend the active time of the second mechanism of the first terminal or whether to trigger a timer of the second mechanism of the first terminal includes at least one of the following:

(1) in a case that the first terminal fails to demodulate the received packet, extending the active time of the second mechanism of the first terminal;

(2) in a case that the first terminal fails to demodulate the received packet, triggering the timer of the second mechanism of the first terminal;

(3) in a case that the HARQ-ACK information corresponding to the packet received by the first terminal is NACK, extending the active time of the second mechanism of the first terminal;

(4) in a case that the HARQ-ACK information corresponding to the packet received by the first terminal is NACK, triggering the timer of the second mechanism of the first terminal;

(5) in a case that the first terminal successfully demodulates the received data packet, skipping extending the active time of the second mechanism of the first terminal;

(6) in a case that the first terminal successfully demodulates the received data packet, skipping triggering the timer of the second mechanism of the first terminal;

(7) in a case that the HARQ-ACK information corresponding to the data packet received by the first terminal is ACK, skipping extending the active time of the second mechanism of the first terminal; and (8) in a case that the HARQ-ACK information corresponding to the data packet received by the first terminal is ACK, skipping triggering the timer of the second mechanism of the first terminal.

In an optional implementation of this embodiment of this application, the determining, by the first terminal based on distance between a reception time of the data packet and an ending point of the active time of the second mechanism, whether to extend the active time of the second mechanism of the first terminal or whether to trigger the timer of the second mechanism includes the following:

(1) in a case that the distance between the reception time of the packet and the ending point of the active time of the second mechanism of the first terminal is less than a tenth preset threshold, extending, by the first terminal, the active time of the second mechanism of the first terminal or triggering the timer of the second mechanism of the first terminal; and (2) in a case that the distance between the reception time of the packet and the ending point of the active time of the second mechanism of the first terminal is greater than or equal to the tenth preset threshold, skipping extending, by the first terminal, the active time of the second mechanism of the first terminal or determining to skip triggering the timer of the second mechanism of the first terminal.

In an optional implementation of this embodiment of this application, the determining, by the first terminal based on distance between the reception time of the packet and a starting point of the inactive time of the second mechanism of the first terminal, whether to extend the active time of the second mechanism of the first terminal or whether to trigger the timer of the second mechanism of the first terminal includes the following:

(1) in a case that the distance between the reception time of the packet and the starting point of the inactive time of the second mechanism of the first terminal is less than an eleventh preset threshold, extending, by the first terminal, the active time of the second mechanism of the first terminal or triggering the timer of the second mechanism; and (2) in a case that the distance between the reception time of the packet and the starting point of the inactive time of the second mechanism is greater than or equal to the eleventh preset threshold, skipping extending, by the first terminal, the active time of the second mechanism of the first terminal or determining to skip triggering the timer of the second mechanism of the first terminal.

In an optional implementation of this embodiment of this application, the first target operation in this embodiment of this application includes at least one of the following:

(1) in a case that distance between the second object and a starting point of the active time of the second mechanism of the first terminal is greater than a twelfth preset threshold, entering the active time of the second mechanism of the first terminal at a sixth time;

(2) in a case that the distance between the second object and the starting point of the active time of the second mechanism of the first terminal is greater than the twelfth preset threshold, starting the timer of the second mechanism of the first terminal at the sixth time;

(3) in a case that distance between the second object and the ending point of the active time of the second mechanism of the first terminal is greater than a thirteenth preset threshold, entering the active time of the second mechanism of the first terminal or starting the timer of the second mechanism of the first terminal at the sixth time; and (4) in a case that the distance between the second object and the ending point of the active time of the second mechanism of the first terminal is greater than the thirteenth preset threshold, starting the timer of the second mechanism of the first terminal at the sixth time.

The sixth time includes one of the following: a time at which the second object is located and a result of the time at which the second object is located plus a preset offset value.

In an optional implementation of this embodiment of this application, the method according to this embodiment of this application may further include the following steps.

Step 608. In a case that the distance between the second object and the starting point of the active time of the second mechanism of the first terminal is less than or equal to a fourteenth preset threshold, the first terminal extends the active time of the second mechanism of the first terminal or triggers the timer of the second mechanism of the first terminal until the first terminal completes transmission.

"Until the first terminal completes the transmission" may mean that the first terminal has completed reception of all desired resources.

Step 610. In a case that the distance between the second object and the ending point of the active time of the second mechanism of the first terminal is less than or equal to a fifteenth preset threshold, the first terminal extends the active time of the second mechanism of the first terminal or triggers the timer of the second mechanism of the first terminal until the first terminal completes transmission.

In an optional implementation of this embodiment of this application, the second target operation in this embodiment of this application includes at least one of the following:

(1) adjusting upward a priority of a resource that is within the active time of the second mechanism of the first terminal;

(2) increasing an RSRP threshold corresponding to resource preemption that is within the active time of the second mechanism of the first terminal;

(3) increasing an RSRP threshold corresponding to resource exclusion that is within the active time of the second mechanism of the first terminal;

(4) increasing an RSRP threshold corresponding to resource reevaluation that is within the active time of the second mechanism of the first terminal;

(5) adjusting downward a priority of a resource that is not within the active time of the second mechanism of the first terminal;

(6) lowering an RSRP threshold corresponding to resource preemption that is not within the active time of the second mechanism of the first terminal;

(7) lowering an RSRP threshold corresponding to resource exclusion that is not within the active time of the second mechanism of the first terminal; and (8) lowering an RSRP threshold corresponding to resource reevaluation that is not within the active time of the second mechanism of the first terminal.

In an optional implementation of this embodiment of this application, the method according to this embodiment of this application may further include at least one of the following steps.

Step 612. In a case that the number of times of the reception time of the packet being not within the active time of the second mechanism of the first terminal is greater than a sixteenth preset threshold, the first terminal triggers renegotiation of the configuration parameter for the second mechanism of the first terminal.

Step 614. In a case that the number of times of distance between the reception time of the packet and the active time of the second mechanism of the first terminal being greater than a seventeenth preset threshold is greater than an eighteenth preset threshold, the first terminal triggers renegotiation of the configuration parameter for the second mechanism of the first terminal.

Step 616. In a case that the number of times of extending the active time of the second mechanism of the first terminal is greater than a nineteenth preset threshold, the first terminal triggers renegotiation of the configuration parameter for the second mechanism of the first terminal.

Step 618. In a case that the number of times of triggering the timer of the second mechanism of the first terminal is greater than a twentieth preset threshold, the first terminal triggers renegotiation of the configuration parameter for the second mechanism of the first terminal.

It should be noted that after triggering renegotiation of the configuration parameter for the second mechanism of the first terminal, the first terminal does not trigger negotiation of the configuration parameter for the second mechanism of the first terminal within a preset time. It can be learned from step 612 to step 618 that if the foregoing cases occur, renegotiation of the configuration parameter for the second mechanism needs to be triggered, so as to guarantee reliability of services.

In an optional implementation of this embodiment of this application, the method according to this embodiment of this application may further include the following steps.

Step 620. In case of resource exclusion, the first terminal excludes a resource that is not within the active time of the second mechanism of the second terminal.

Step 622. In case of selecting a transmission resource, the first terminal selects a resource that is located within the active time of the second mechanism of the second terminal.

According to step 620 and step 622, the first terminal can exclude the resource that is not within the active time of the second mechanism of the second terminal or select, for transmission, the resource that is within the active time of the second mechanism of the second terminal. Both options can improve reliability of service transmission.

In an optional implementation of this embodiment of this application, the method according to this embodiment of this application may further include at least one of the following steps.

Step 624. In case of groupcast or broadcast communication, the first terminal configures the configuration parameter of the target resource of the first mechanism of the first terminal.

Step 626. In case of unicast communication, the first terminal configures the configuration parameter for the second mechanism of the first terminal.

According to step 624 and step 626, in this application, the configuration parameter for the first mechanism or second mechanism of the first terminal can be configured in different cases of communication, that is, configuration can be performed in a more targeted manner, and efficiency and accuracy of the configuration are improved.

In an optional implementation of this embodiment of this application, the method according to this embodiment of this application may further include at least one of the following steps.

Step 628. The first terminal demodulates a packet received outside the active time of the second mechanism of the first terminal or during the inactive time of the second mechanism of the first terminal.

Step 630. The first terminal skips demodulating a packet received outside the active time of the second mechanism of the first terminal or during the inactive time of the second mechanism of the first terminal.

In an optional implementation of this embodiment of this application, the method according to this embodiment of this application may further include: Step 632. The first terminal receives a third object outside a sensing time of the first mechanism of the first terminal; and/or the first terminal skips receiving the third object outside the sensing time of the first mechanism of the first terminal.

It should be noted that in this embodiment of this application, the third object includes at least one of the following: a physical sidelink control channel PSCCH, a physical sidelink shared channel PSSCH, a physical sidelink broadcast channel PSBCH, a physical sidelink feedback channel PSFCH, sidelink control information SCI, a synchronization signal and PBCH block SSB, and a reference signal RS. In addition, in this embodiment of this application, the third object is indicated or reserved by SCI.

In an optional implementation of this embodiment of this application, the skipping receiving, by the first terminal, the third object outside the sensing time of the first mechanism of the first terminal includes: skipping receiving, by the first terminal, the third object at anon-sensing time that is within the active time of the second mechanism of the first terminal. The receiving, by the first terminal, a third object outside the sensing time of the first mechanism of the first terminal includes: receiving, by the first terminal, the third object at a non-sensing time that is within the active time of the second mechanism of the first terminal.

In an optional implementation of this embodiment of this application, the method according to this embodiment of this application may further include the following step.

Step 634. The first terminal indicates the processing latency to another terminal communicating with the first terminal.

In an optional implementation of this embodiment of this application, the method according to this embodiment of this application may further include at least one of the following steps.

Step 636. The first terminal determines, based on first configuration information, whether to perform sidelink SL measurement within the inactive time of the second mechanism of the first terminal.

Step 638. The first terminal determines, based on second configuration information, whether to perform SL measurement within a non-sensing time that is within the active time of the second mechanism of the first terminal.

Step 640. The first terminal determines, based on third configuration information, whether to perform feedback within the active time of the second mechanism of the first terminal.

In this embodiment of this application, in addition to feedback, response is also applicable.

According to step 634 to step 640, the first terminal can determine, based on the configuration information, whether to perform corresponding measurement and feedback.

It should be noted that in a case that a measurement result of the SL measurement satisfies a preset condition, the first terminal performs at least one of the following operations:

(1) extending, by the first terminal, the active time of the second mechanism of the first terminal;

(2) extending, by the first terminal, the inactive time of the second mechanism of the first terminal;

(3) triggering, by the first terminal, a timer of the second mechanism of the first terminal;

(4) shortening, by the first terminal, the active time of the second mechanism of the first terminal;

(5) shortening, by the first terminal, the inactive time of the second mechanism of the first terminal;

(6) setting, by the first terminal, the active time of the second mechanism of the first terminal to a default value or a preset value; and (7) setting, by the first terminal, the inactive time of the second mechanism of the first terminal to a default value or a preset value.

The preset condition includes at least one of the following: the measurement result of the SL measurement being greater than a twenty-first preset threshold, and the measurement result of the SL measurement being less than a twenty-second preset threshold.

In an optional implementation of this embodiment of this application, the first terminal obtains an extended amount or a shortened amount of the active time of the second mechanism of the first terminal and/or of the inactive time of the second mechanism of the first terminal in at least one of the following manners: being configured by a network, being preconfigured, being indicated by another device, being prescribed by a protocol, and being determined by the first terminal.

It should be noted that in this embodiment of this application, the extension or shortening of the active time of the second mechanism and inactive time of the second mechanism is applicable to an active time or inactive time of at least one subsequent second mechanism.

Optionally, the SL measurement includes at least one of the following: channel busy ratio (CBR) measurement, channel occupancy ratio (CR) measurement, layer 1 reference signal received power L1-RSRP measurement, and L3-RSRP measurement. In addition, in another implementation of this embodiment of this application, the SL measurement may alternatively include system measurement, carrier measurement, BWP measurement, resource pool measurement, user measurement, connection measurement, and group measurement; and specific measurement parameters of the SL measurement may be at least one of the following: occupancy ratio, occupancy quantity, blocking rate, blocking quantity, idle rate, idle quantity, transmission success count, transmission success rate, transmission failure count, transmission failure rate, DTX count, count of missed detection, count of false detection, and measurement of retransmission count.

It should be noted that the transmission configuration method according to this embodiment of this application may be executed by a transmission configuration apparatus or a control module for executing the transmission configuration method in the transmission configuration apparatus. In the embodiments of this application, the transmission configuration method being executed by the transmission configuration apparatus is used as an example to describe the transmission configuration apparatus according to the embodiments of this application.

Figure 7:
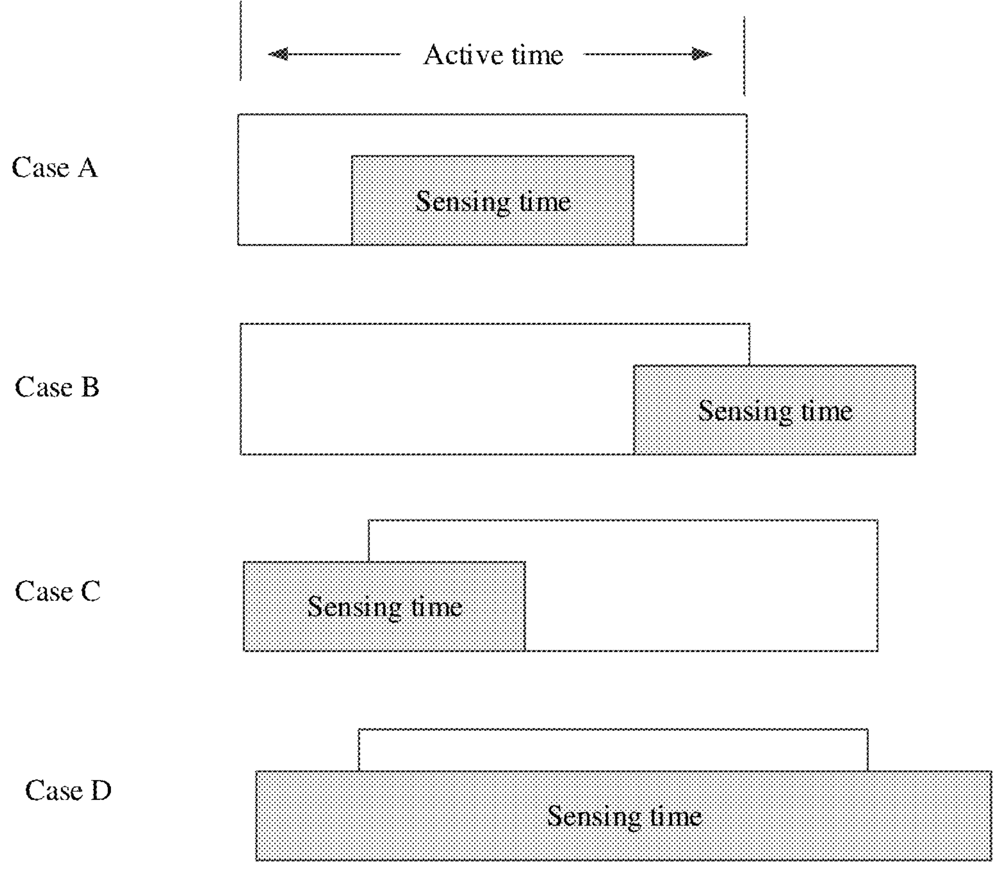
FIG. 7 is a first schematic diagram of a sensing time overlapping an active time according to an embodiment of this application.

The following describes, with examples, this application with reference to specific implementations of the embodiments of this application. As shown in FIG. 7, in case A, a starting point (n+T1) of a sensing time is between a starting point and ending point of an active time, and an ending point (n+T2) of the sensing time is between the starting point and ending point of the active time; where n is a time at which resource selection/reselection is triggered, and T1≤T2.

In case B, the starting point (n+T1) of the sensing time is between the starting point and ending point of the active time, and the ending point (n+T2) of the sensing time is no earlier than the ending point of the active time; where n is the time at which resource selection/reselection is triggered, and T1≤T2.

In case C, the starting point (n+T1) of the sensing time is no later than the starting point of the active time, and the ending point (n+T2) of the sensing time is between the starting point and ending point of the active time; where n is the time at which resource selection/reselection is triggered, and T1≤T2.

In case D, the starting point (n+T 1) of the sensing time is no later than the starting point of the active time, and the ending point (n+T2) of the sensing time is no earlier than the ending point of the active time; where n is the time at which resource selection/reselection is triggered, and T1≤T2.

Figure 8:
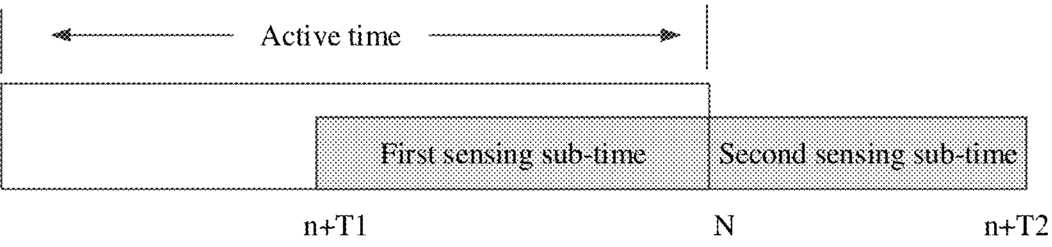
FIG. 8 is a second schematic diagram of a sensing time overlapping an active time according to an embodiment of this application.

As shown in FIG. 8, to ensure that a packet for initial transmission falls within an active time of a peer terminal, a terminal divides an original sensing time (interval [n+T1, n+T2] in FIG. 8) into two new sensing sub-times, an overlapping portion between the original sensing time and the active time is a first sensing sub-time (interval [n+T1, N] in FIG. 8), and a non-overlapping portion between the original sensing time and the active time is a second sensing sub-time (interval [N, n+T2] in FIG. 8), where N is an ending point of the active time of the peer UE, n is a time at which resource selection/reselection is triggered, and T1≤T2. The terminal selects a resource for initial transmission at the first sensing sub-time and selects a resource for retransmission at the second sensing sub-time.

Figure 9:
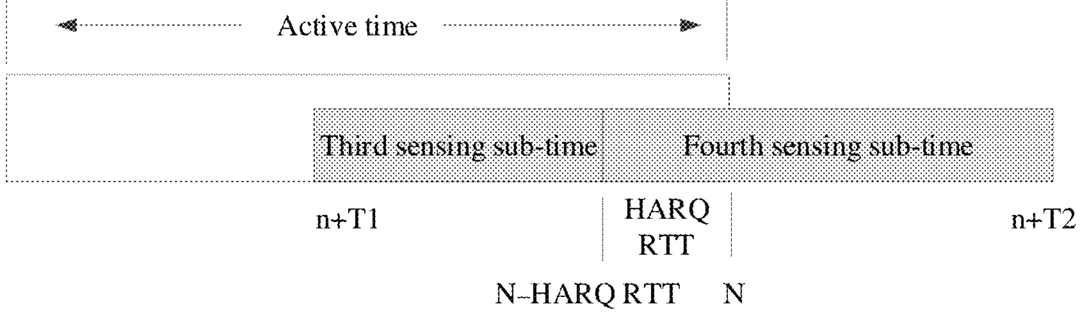
FIG. 9 is a third schematic diagram of a sensing time overlapping an active time according to an embodiment of this application.

As shown in FIG. 9, to ensure that a packet for initial transmission and a corresponding packet for retransmission both fall within an active time of a peer terminal, a terminal divides an original sensing time (interval [n+T1, n+T2] in FIG. 9) into two new sensing sub-times. Given that an offset value is offset=0, a third sensing sub-time (interval [n+T1, N-HARQ RTT] in FIG. 9) is from a starting point of the original sensing time to (N-HARQ RTT), and a fourth sensing sub-time (interval [N-HARQ RTT, n+T2] in FIG. 9) is from (N-HARQ RTT) to an ending point of the original sensing time, where N is an ending point of the active time of the peer UE, HARQ RTT is a sum of an interval between feedback information and corresponding data and an upper limit of a processing latency of the feedback information, n is a time at which resource selection/reselection is triggered, and T1≤T2. The UE selects a resource for initial transmission at the third sensing sub-time, ensuring that the packet for initial transmission and the corresponding packet for retransmission (if any) both fall within the active time of the peer terminal.

Figure 10:
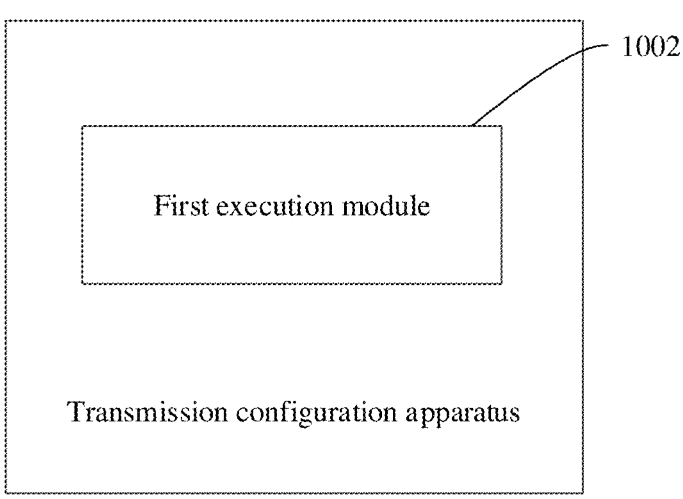
FIG. 10 is a schematic structural diagram of a transmission configuration apparatus according to an embodiment of this application.

As shown in FIG. 10, an embodiment of this application provides a transmission configuration apparatus. The apparatus is applied to a first terminal and includes:

a first execution module 1002 configured to perform a first operation; where the first operation includes one of the following:

configuring a configuration parameter of a target resource of a first mechanism of the first terminal such that the target resource of the first mechanism of the first terminal at least partially overlaps an active time of a second mechanism of a second terminal;

selecting a resource for transmission from a first time; and configuring a configuration parameter for a second mechanism of the first terminal such that an active time of the second mechanism of the first terminal at least partially overlaps a target resource of a first mechanism of a third terminal; where the target resource includes at least one of the following: a resource selection time and a selectable range of the resource selection time; and the second mechanism includes the active time and an inactive time.

According to the transmission configuration apparatus in this embodiment of this application, the configuration parameter of the target resource of the first mechanism of the first terminal may be configured such that the target resource of the first mechanism of the first terminal at least partially overlaps the active time of the second mechanism of the second terminal, the configuration parameter for the second mechanism of the first terminal may be further configured such that the active time of the second mechanism of the first terminal at least partially overlaps the target resource of the first mechanism of the third terminal, and the resource for transmission may be selected within the first time. This enables data or packets sent by the first terminal to arrive within active times of terminals communicating with the first terminal, and specifies an operation of the first terminal for a case that data or packets sent by the first terminal do not arrive within active times of terminals communicating with the first terminal. This guarantees reliability of sidelink services while achieving energy saving, and thus solves the problems of low reliability of sidelink services and high power consumption due to failure in processing transmissions or packets located at some specific times because DRX active times and sensing times are not aligned between terminals.

Optionally, in this embodiment of this application, the configuring a configuration parameter of a target resource of a first mechanism of the first terminal includes at least one of the following:

(1) configuring a starting point of the target resource to be no later than an ending point of the active time of the second mechanism of the second terminal, where the starting point of the target resource being no later than the ending point of the active time of the second mechanism of the second terminal includes at least one of the following: the starting point of the target resource being no later than the starting point of the active time of the second mechanism of the second terminal, and the starting point of the target resource being located between the starting point and ending point of the active time of the second mechanism of the second terminal; and (2) configuring the starting point of the target resource to be no earlier than a starting point of the active time of the second mechanism of the second terminal, where the starting point of the target resource being no earlier than the starting point of the active time of the second mechanism of the second terminal includes at least one of the following: the ending point of the target resource being no earlier than the ending point of the active time of the second mechanism of the second terminal, and the ending point of the target resource being located between the starting point and ending point of the active time of the second mechanism of the second terminal.

Optionally, the at least partially overlapping in this embodiment of this application may include at least one of the following:

(1) length of an overlapping portion between the target resource and the active time of the second mechanism of the second terminal being greater than or equal to a first preset threshold;

(2) a ratio of the overlapping portion between the target resource and the active time of the second mechanism of the second terminal to the target resource being greater than or equal to a second preset threshold;

(3) a ratio of the overlapping portion between the target resource and the active time of the second mechanism of the second terminal to the active time being greater than or equal to a third preset threshold;

(4) a ratio of the overlapping portion between the target resource and the active time of the second mechanism of the second terminal to a period of the second mechanism being greater than or equal to a fourth preset threshold;

(5) length of an overlapping portion between the active time of the second mechanism of the first terminal and the target resource of the first mechanism of the third terminal being greater than or equal to a fifth preset threshold;

(6) a ratio of the overlapping portion between the active time of the second mechanism of the first terminal and the target resource of the first mechanism of the third terminal to the target resource being greater than or equal to a sixth preset threshold;

(7) a ratio of the overlapping portion between the active time of the second mechanism of the first terminal and the target resource of the first mechanism of the third terminal to the active time of the second mechanism of the first terminal being greater than or equal to a seventh preset threshold; and (8) a ratio of the overlapping portion between the active time of the second mechanism of the first terminal and the target resource of the first mechanism of the third terminal to a period of the second mechanism of the first terminal being greater than or equal to an eighth preset threshold.

Optionally, the selecting a resource for transmission from a first time in this embodiment of this application includes at least one of the following:

(1) selecting, by the first terminal, a resource for initial transmission from a second time; and (2) selecting, by the first terminal, a resource for retransmission from a third time, where the second time is an overlapping portion between the target resource of the first mechanism of the first terminal and the active time of the second mechanism of the second terminal, and the third time is a non-overlapping portion between the target resource of the first mechanism of the first terminal and the active time of the second mechanism of the second terminal. The first time includes the second time and the third time.

Optionally, the selecting a resource for transmission from a first time in this embodiment of this application includes at least one of the following:

(1) selecting, by the first terminal, a resource for initial transmission from a fourth time; and (2) selecting, by the first terminal, a resource for retransmission from a fifth time, where the fourth time is an interval from a starting point of the target resource to a first time point, and the fifth time is an interval from a second time point to an ending point of the target resource; the first time point being a result of an ending point of the active time of the second mechanism of the second terminal minus the product of L and a ninth preset threshold, the second time point being a result of the ending time point of the active time of the second mechanism of the second terminal minus the product of L and the ninth preset threshold and plus an offset value, and L being an integer greater than or equal to 1. The first time includes the fourth time and the fifth time.

It should be noted that in this embodiment of this application, a manner of selecting the resource for initial transmission is different from a manner of selecting the resource for retransmission.

Optionally, the apparatus in this embodiment of this application may further include:

a second execution module configured to: in a case that the target resource of the first terminal and the active time of the second mechanism of the second terminal do not overlap at all, perform a second operation; where the second operation includes at least one of the following: skipping transmission within the target resource; skipping sensing within a sensing time corresponding to the target resource; triggering resource selection; triggering resource reselection; triggering radio resource control RRC connection reconfiguration; triggering RRC reconnection; and triggering a report operation.

Optionally, in this embodiment of this application, a first object related to the first terminal is located within the active time of the second mechanism of the second terminal or a sensing time of the first mechanism of the third terminal.

The first object includes at least one of the following: the target resource of the first terminal, a triggering time point of resource selection and a starting point of the selectable range of the resource selection time, a triggering time point of resource reselection and a starting point of the selectable range of the resource selection time, a triggering time point of resource selection and an ending point of the selectable range of the resource selection time, a triggering time point of resource reselection and an ending point of the selectable range of the resource selection time, a candidate resource, first-stage sidelink control information SCI, and second-stage SCI, where the first-stage SCI is related to the second-stage SCI.

Optionally, the apparatus in this embodiment of this application may further include a transmitting module configured to perform transmission within the active time of the second mechanism of the second terminal or within a sensing time of the first mechanism of the third terminal.

In this embodiment of this application, the configuration parameter for the second mechanism of the first terminal may be configured in at least one of the following manners such that the active time of the second mechanism of the first terminal at least partially overlaps the target resource of the first mechanism of the third terminal: being configured by a network-side device, being preconfigured, being indicated by another terminal, being prescribed by a protocol, and being determined by the first terminal.

Optionally, in this embodiment of this application, the configuring the configuration parameter for the second mechanism such that the active time of the second mechanism of the first terminal at least partially overlaps the target resource of the first mechanism of the third terminal includes at least one of the following:

(1) configuring the configuration parameter for the second mechanism by using first indication information such that the active time of the second mechanism of the first terminal at least partially overlaps the target resource of the first mechanism of the third terminal, where the first indication information is sent by the third terminal; and (2) configuring a configuration parameter for the second mechanism of the first terminal based on a received packet such that the active time of the second mechanism of the first terminal at least partially overlaps the target resource of the first mechanism of the third terminal; and (3) notifying a model for the first mechanism of the first terminal to the third terminal.

In this embodiment of this application, the second mechanism has a timer with a variable starting point or length, where that the second mechanism has a timer with a variable starting point or length includes at least one of the following:

the starting point of the timer being related to a resource reselection time; an ending point of the timer being related to a resource reselection time; the starting point of the timer being related to a resource preemption time; the ending point of the timer being related to a resource preemption time; the starting point of the timer being related to a resource exclusion time; the ending point of the timer being related to a resource exclusion time; and the length of the timer being related to a ninth preset threshold.

It should be noted that in this embodiment of this application, the ninth preset threshold includes at least one of the following: a first interval between feedback information and corresponding data, a processing latency of the feedback information, and a sum of the first interval and the processing latency.

The feedback information is related to a transmission packet. The processing latency includes at least one of the following: a maximum value of the processing latency and a minimum value of the processing latency.

In addition, the sum of the first interval and the processing latency includes at least one of the following: a sum of the first interval and a maximum value of the processing latency; a sum of the first interval and a minimum value of the processing latency; a minimum value of the sum of the first interval and the processing latency; and a maximum value of the sum of the first interval and the processing latency.

In this embodiment of this application, the configuring the configuration parameter for the second mechanism by using first indication information includes at least one of the following:

(1) setting, by the first terminal, a period of the second mechanism of the first terminal to a multiple or factor of a service period of the third terminal indicated by the first indication information;

(2) setting, by the first terminal, length of the active time of the second mechanism of the first terminal to length of a selectable range of a resource selection window. The first indication information is used to indicate at least one of the following: distance between a triggering time point of resource selection of the third terminal and a starting point of the selectable range of the resource selection time, distance between a triggering time point of resource reselection of the third terminal and the starting point of the selectable range of the resource selection time, distance between the triggering time point of resource selection of the third terminal and an ending point of the selectable range of the resource selection time, and distance between the triggering time point of resource reselection of the third terminal and the ending point of the selectable range of the resource selection time; and (3) configuring the configuration parameter for the second mechanism of the first terminal according to configuration information of a second mechanism indicated by the first indication information, where the second mechanism is a second mechanism desired by the third terminal or a second mechanism coordinated with service of the third terminal.

Optionally, in this embodiment of this application, the first indication information is further used to indicate at least one of the following information: whether to extend the active time of the second mechanism of the first terminal, whether to trigger a timer of the second mechanism of the first terminal, an extended amount of the active time of the second mechanism of the first terminal, and length of the timer of the second mechanism of the first terminal.

Optionally, in this embodiment of this application, the configuring the configuration parameter for the second mechanism of the first terminal based on a received packet includes at least one of the following:

(1) determining, based on a demodulation result of the received packet or HARQ-ACK information corresponding to the packet, whether to extend the active time of the second mechanism of the first terminal;

(2) determining, based on the demodulation result of the received packet or the HARQ-ACK information corresponding to the packet, whether to trigger a timer of the second mechanism of the first terminal;

(3) determining, based on distance between a reception time of the packet and an ending point of the active time of the second mechanism of the first terminal, whether to extend the active time of the second mechanism of the first terminal;

(4) determining, based on the distance between the reception time of the packet and the ending point of the active time of the second mechanism of the first terminal, whether to trigger the timer of the second mechanism of the first terminal;

(5) determining, based on distance between the reception time of the packet and a starting point of the inactive time of the second mechanism of the first terminal, whether to extend the active time of the second mechanism of the first terminal;

(6) determining, based on the distance between the reception time of the packet and the starting point of the inactive time of the second mechanism of the first terminal, whether to trigger the timer of the second mechanism of the first terminal;

(7) in a case that the first terminal discovers that a second object is located within the inactive time of the second mechanism of the first terminal, performing a first target operation; and (8) in a case that the first terminal discovers that the second object is located within the active time of the second mechanism of the first terminal, performing a second target operation.

The second object is a transmission or transmission resource desired by the first terminal.

Optionally, in this embodiment of this application, the second object is related to an aperiodic indication.

Optionally, in this embodiment of this application, the extending the active time of the second mechanism of the first terminal includes at least one of the following: starting extending the active time of the second mechanism of the first terminal at a reception time of second indication information, starting extending the active time of the second mechanism of the first terminal at the reception time of the packet, starting extending the active time of the second mechanism of the first terminal at a reception failure time of the packet, starting extending the active time of the second mechanism of the first terminal at a transmission failure time of the packet, and starting extending the active time of the second mechanism of the first terminal at a demodulation failure time of the packet.

Optionally, in this embodiment of this application, the triggering the timer of the second mechanism of the first terminal in this embodiment of this application includes at least one of the following: starting triggering the timer of the second mechanism of the first terminal at the reception time of the second indication information, starting triggering the timer of the second mechanism of the first terminal at the reception time of the packet, starting triggering the timer of the second mechanism of the first terminal at the reception failure time of the packet, starting triggering the timer of the second mechanism of the first terminal at the transmission failure time of the packet, and starting triggering the timer of the second mechanism of the first terminal at the demodulation failure time of the packet.

Optionally, in this embodiment of this application, the determining, based on a demodulation result of the received packet or HARQ-ACK information corresponding to the packet, whether to extend the active time of the second mechanism of the first terminal or whether to trigger a timer of the second mechanism of the first terminal includes at least one of the following:

(1) in a case that demodulation of the received packet fails, extending the active time of the second mechanism of the first terminal;

(2) in a case that demodulation of the received packet fails, triggering the timer of the second mechanism of the first terminal;

(3) in a case that the HARQ-ACK information corresponding to the received packet is NACK, extending the active time of the second mechanism of the first terminal;

(4) in a case that the HARQ-ACK information corresponding to the received packet is NACK, triggering the timer of the second mechanism of the first terminal;

(5) in a case that the received data packet is successfully demodulated, skipping extending the active time of the second mechanism of the first terminal;

(6) in a case that the received data packet is successfully demodulated, skipping triggering the timer of the second mechanism of the first terminal;

(7) in a case that the HARQ-ACK information corresponding to the received data packet is ACK, skipping extending the active time of the second mechanism of the first terminal; and (8) in a case that the HARQ-ACK information corresponding to the received data packet is ACK, skipping triggering the timer of the second mechanism of the first terminal.

Optionally, in this embodiment of this application, the determining, based on distance between a reception time of the data packet and an ending point of the active time of the second mechanism, whether to extend the active time of the second mechanism of the first terminal or whether to trigger the timer of the second mechanism includes the following:

(1) in a case that the distance between the reception time of the packet and the ending point of the active time of the second mechanism of the first terminal is less than a tenth preset threshold, extending the active time of the second mechanism of the first terminal or triggering the timer of the second mechanism of the first terminal; and (2) in a case that the distance between the reception time of the packet and the ending point of the active time of the second mechanism of the first terminal is greater than or equal to the tenth preset threshold, skipping extending the active time of the second mechanism of the first terminal or determining to skip triggering the timer of the second mechanism of the first terminal.

Optionally, in this embodiment of this application, the determining, based on distance between the reception time of the packet and a starting point of the inactive time of the second mechanism of the first terminal, whether to extend the active time of the second mechanism of the first terminal or whether to trigger the timer of the second mechanism of the first terminal includes the following:

(1) in a case that the distance between the reception time of the packet and the starting point of the inactive time of the second mechanism of the first terminal is less than an eleventh preset threshold, extending the active time of the second mechanism of the first terminal or triggering the timer of the second mechanism; and (2) in a case that the distance between the reception time of the packet and the starting point of the inactive time of the second mechanism is greater than or equal to the eleventh preset threshold, skipping extending the active time of the second mechanism of the first terminal or determining to skip triggering the timer of the second mechanism of the first terminal.

It should be noted that in this embodiment of this application, the packet includes one of the following: a packet related to initial transmission and a packet related to retransmission.

Optionally, in this embodiment of this application, the first target operation includes at least one of the following:

(1) in a case that distance between the second object and a starting point of the active time of the second mechanism of the first terminal is greater than a twelfth preset threshold, entering the active time of the second mechanism of the first terminal at a sixth time;

(2) in a case that the distance between the second object and the starting point of the active time of the second mechanism of the first terminal is greater than the twelfth preset threshold, starting the timer of the second mechanism of the first terminal at the sixth time;

(3) in a case that distance between the second object and the ending point of the active time of the second mechanism of the first terminal is greater than a thirteenth preset threshold, entering the active time of the second mechanism of the first terminal or starting the timer of the second mechanism of the first terminal at the sixth time; and (4) in a case that the distance between the second object and the ending point of the active time of the second mechanism of the first terminal is greater than the thirteenth preset threshold, starting the timer of the second mechanism of the first terminal at the sixth time.

The sixth time includes one of the following: a time at which the second object is located and a result of the time at which the second object is located plus a preset offset value.

Optionally, the apparatus in this embodiment of this application may further include:

a first extension module configured to: in a case that the distance between the second object and the starting point of the active time of the second mechanism of the first terminal is less than or equal to a fourteenth preset threshold, extend the active time of the second mechanism of the first terminal or trigger the timer of the second mechanism of the first terminal until the first terminal completes transmission; and a second extension module configured to: in a case that the distance between the second object and the ending point of the active time of the second mechanism of the first terminal is less than or equal to a fifteenth preset threshold, extend the active time of the second mechanism of the first terminal or trigger the timer of the second mechanism of the first terminal until the first terminal completes transmission.

Optionally, in this embodiment of this application, the second target operation includes at least one of the following:

(1) adjusting upward a priority of a resource that is within the active time of the second mechanism of the first terminal;

(2) increasing an RSRP threshold corresponding to resource preemption that is within the active time of the second mechanism of the first terminal;

(3) increasing an RSRP threshold corresponding to resource exclusion that is within the active time of the second mechanism of the first terminal;

(4) increasing an RSRP threshold corresponding to resource reevaluation that is within the active time of the second mechanism of the first terminal;

(5) adjusting downward a priority of a resource that is not within the active time of the second mechanism of the first terminal;

(6) lowering an RSRP threshold corresponding to resource preemption that is not within the active time of the second mechanism of the first terminal;

(7) lowering an RSRP threshold corresponding to resource exclusion that is not within the active time of the second mechanism of the first terminal; and (8) lowering an RSRP threshold corresponding to resource reevaluation that is not within the active time of the second mechanism of the first terminal.

In this embodiment of this application, the length of the timer of the second mechanism of the first terminal and/or an extended amount of the active time of the second mechanism of the first terminal may be obtained in at least one the following manners: being configured by a network, being preconfigured, being indicated by another device, being prescribed by a protocol, and being determined by the first terminal.

Optionally, the apparatus in this embodiment of this application further includes at least one of the following:

a first triggering module configured to: in a case that the number of times of the reception time of the packet being not within the active time of the second mechanism of the first terminal is greater than a sixteenth preset threshold, trigger renegotiation of the configuration parameter for the second mechanism of the first terminal;

a second triggering module configured to: in a case that the number of times of distance between the reception time of the packet and the active time of the second mechanism of the first terminal being greater than a seventeenth preset threshold is greater than an eighteenth preset threshold, trigger renegotiation of the configuration parameter for the second mechanism of the first terminal;

a third triggering module configured to: in a case that the number of times of extending the active time of the second mechanism of the first terminal is greater than a nineteenth preset threshold, trigger renegotiation of the configuration parameter for the second mechanism of the first terminal; and a fourth triggering module configured to: in a case that the number of times of triggering the timer of the second mechanism of the first terminal is greater than a twentieth preset threshold, trigger renegotiation of the configuration parameter for the second mechanism of the first terminal.

It should be noted that after triggering renegotiation of the configuration parameter for the second mechanism of the first terminal, the first terminal does not trigger negotiation of the configuration parameter for the second mechanism of the first terminal within a preset time.

Optionally, the apparatus in this embodiment of this application further includes an exclusion module configured to: in case of resource exclusion, exclude a resource that is not within the active time of the second mechanism of the second terminal.

Optionally, the apparatus in this embodiment of this application further includes a selection module configured to: in case of selecting a transmission resource, select a resource that is located within the active time of the second mechanism of the second terminal.

Optionally, the apparatus in this embodiment of this application further includes at least one of the following: a first configuration module configured to: in case of groupcast or broadcast communication, configure the configuration parameter of the target resource of the first mechanism of the first terminal; and a second configuration module configured to: in case of unicast communication, configure the configuration parameter for the second mechanism of the first terminal.

Optionally, the apparatus in this embodiment of this application further includes at least one of the following: a first processing module configured to demodulate a packet received outside the active time of the second mechanism of the first terminal or during the inactive time of the second mechanism of the first terminal; and a second processing module configured to skip demodulating a packet received outside the active time of the second mechanism of the first terminal or during the inactive time of the second mechanism of the first terminal.

Optionally, the apparatus in this embodiment of this application further includes:

a third processing module configured for the first terminal to receive a third object outside a sensing time of the first mechanism of the first terminal, where the third processing module is further configured to receive the third object at a non-sensing time that is within the active time of the second mechanism of the first terminal; and/or a fourth processing module configured for the first terminal to skip receiving the third object outside the sensing time of the first mechanism of the first terminal, where the fourth processing module is further configured to skip receiving the third object at a non-sensing time that is within the active time of the second mechanism of the first terminal.

Optionally, in this embodiment of this application, the third object includes at least one of the following: a physical sidelink control channel PSCCH, a physical sidelink shared channel PSSCH, a physical sidelink broadcast channel PSBCH, a physical sidelink feedback channel PSFCH, sidelink control information SCI, a synchronization signal and PBCH block SSB, and a reference signal RS.

Optionally, in this embodiment of this application, the third object is indicated or reserved by SCI.

Optionally, the apparatus in this embodiment of this application further includes an indicating module configured to indicate the processing latency to another terminal communicating with the first terminal.

Optionally, the apparatus in this embodiment of this application further includes at least one of the following:

a first determining module configured to determine, based on first configuration information, whether to perform sidelink SL measurement within the inactive time of the second mechanism of the first terminal;

a second determining module configured to determine, based on second configuration information, whether to perform SL measurement within a non-sensing time that is within the active time of the second mechanism of the first terminal; and a third determining module configured to determine, based on third configuration information, whether to perform feedback within the active time of the second mechanism of the first terminal.

Optionally, in this embodiment of this application, in a case that a measurement result of the SL measurement satisfies a preset condition, a third execution module is configured to the perform at least one of the following operations: extending the active time of the second mechanism of the first terminal; extending the inactive time of the second mechanism of the first terminal; triggering a timer of the second mechanism of the first terminal; shortening the active time of the second mechanism of the first terminal; shortening the inactive time of the second mechanism of the first terminal; setting the active time of the second mechanism of the first terminal to a default value or a preset value; and setting the inactive time of the second mechanism of the first terminal to a default value or a preset value.

Optionally, in this embodiment of this application, an extended amount or a shortened amount of the active time of the second mechanism of the first terminal and/or of the inactive time of the second mechanism of the first terminal is obtained in at least one of the following manners: being configured by a network, being preconfigured, being indicated by another device, being prescribed by a protocol, and being determined by the first terminal.

Optionally, in this embodiment of this application, the extension or shortening of the active time of the second mechanism and inactive time of the second mechanism is applicable to an active time or inactive time of at least one subsequent second mechanism.

Optionally, in this embodiment of this application, the preset condition includes at least one of the following: the measurement result of the SL measurement being greater than a twenty-first preset threshold, and the measurement result of the SL measurement being less than a twenty-second preset threshold.

Optionally, in this embodiment of this application, the SL measurement includes at least one of the following: channel busy ratio CBR measurement, channel occupancy ratio CR measurement, layer 1 reference signal received power L1-RSRP measurement, and L3-RSRP measurement.

The transmission configuration apparatus in this embodiment of this application may be an apparatus or a component, integrated circuit, or chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which are not specifically limited in the embodiments of this application.

The transmission configuration apparatus in this embodiment of this application may be an apparatus with an operating system. The operating system may be an android (Android) operating system, may be an iOS operating system, or may be another possible operating system. This is not specifically limited in the embodiments of this application.

The transmission configuration apparatus provided in this embodiment of this application can implement the processes implemented in the method embodiment in FIG. 6 with the same technical effects achieved. To avoid repetition, details are not described herein again.

Figure 11:
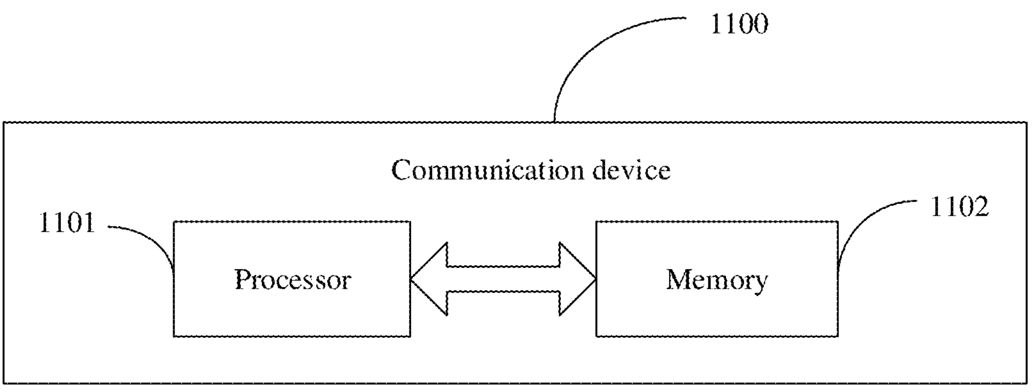
FIG. 11 is a first schematic structural diagram of a terminal according to an embodiment of this application.

Optionally, as shown in FIG. 11, an embodiment of this application further provides a communication device 1100 including a processor 1101, a memory 1102, and a program or instructions stored in the memory 1102 and capable of running on the processor 1101. For example, in a case that the communication device 1100 is a terminal, the program or instructions are executed by the processor 1101 to implement the processes of the transmission configuration method embodiment, with the same technical effects achieved. In a case that the communication device 1100 is a network-side device, the program or instructions are executed by the processor 1101 to implement the processes of the foregoing transmission configuration method embodiment, with the same technical effects achieved. To avoid repetition, details are not described herein again.

Figure 12:
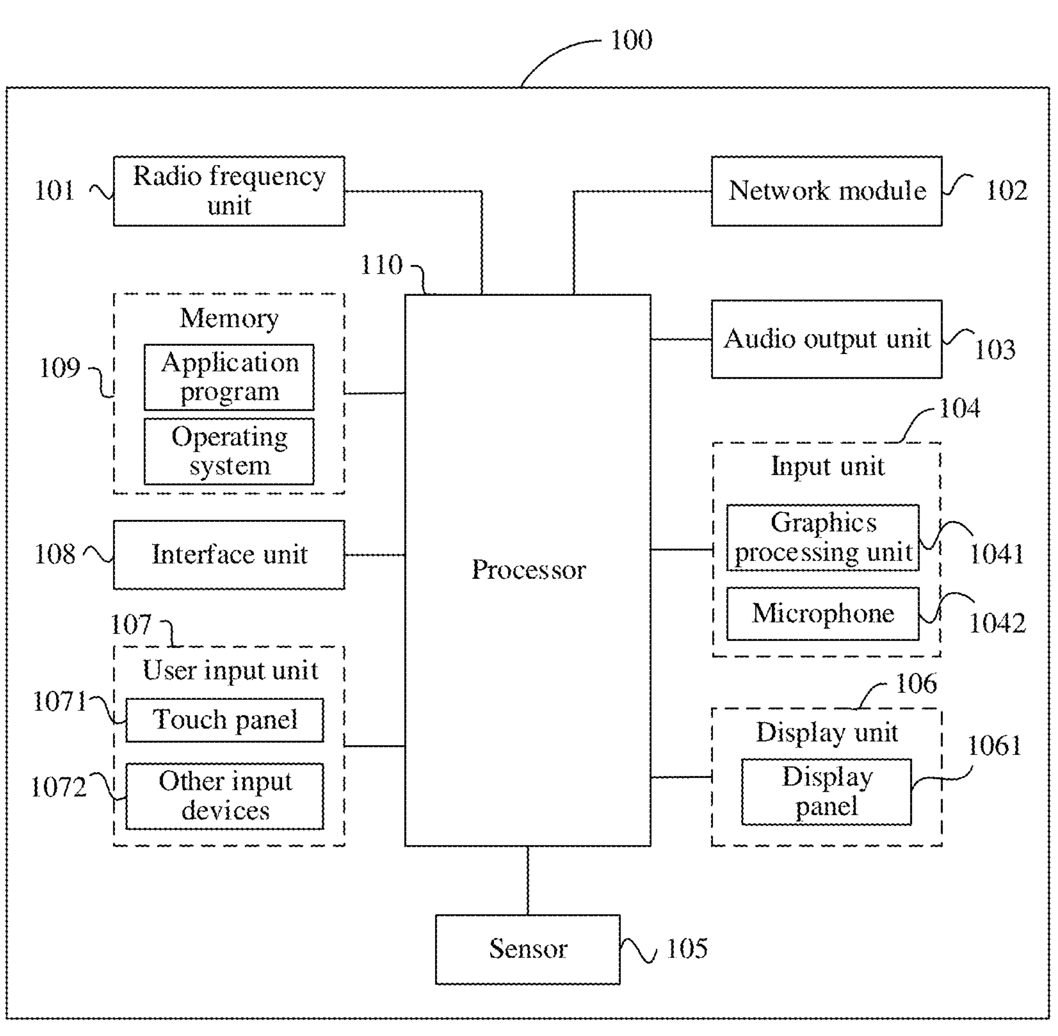
FIG. 12 is a second schematic structural diagram of a terminal according to an embodiment of this application.

FIG. 12 is a schematic diagram of a hardware structure of a terminal according to an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

Persons skilled in the art can understand that the terminal 100 may further include a power supply (for example, battery) that supplies power to various components. The power supply may be logically connected to the processor 110 via a power management system, so that functions such as charge and discharge management and power consumption management are implemented via the power management system. The structure of the terminal shown in FIG. 12 does not constitute any limitation on the terminal, and the terminal may include more or fewer components than shown in the figure, or combine some of the components, or have different arrangements of the components. Details are not described herein.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in an image capture mode or a video capture mode. The display unit 106 may include a display panel 1061. The display panel 1061 may be configured in a form of a liquid crystal display, an organic light-emitting diode display, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a functional button (such as a volume control button or a power on/off button), a trackball, a mouse, and a joystick. Details are not described herein.

In this embodiment of this application, the radio frequency unit 101 sends the downlink data received from a network-side device to the processor 110 for processing, and in addition, sends uplink data to the network-side device. Generally, the radio frequency unit 101 includes but is not limited to an antenna, at least one amplifier, a transceiver, a coupler, a low noise amplifier, and a duplexer.

The memory 109 may be configured to store software programs or instructions and various data. The memory 109 may include a program or instruction storage area and a data storage area. The program or instruction storage area may store an operating system, an application program or instructions required by at least one function (for example, sound play function or image play function), and the like. In addition, the memory 109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid-state storage devices.

The processor 110 may include one or more processing units. Optionally, the processor 110 may integrate an application processor and a modem processor. The application processor mainly processes an operating system, a user interface, application programs or instructions, and the like. The modem processor mainly processes wireless communication, for example, being a baseband processor. It can be understood that the modem processor may alternatively be not integrated in the processor 110.

The processor 110 is configured to perform a first operation, where the first operation includes one of the following:

configuring a configuration parameter of a target resource of a first mechanism of a first terminal such that the target resource of the first mechanism of the first terminal at least partially overlaps an active time of a second mechanism of a second terminal;

selecting a resource for transmission from a first time; and configuring a configuration parameter for a second mechanism of the first terminal such that an active time of the second mechanism of the first terminal at least partially overlaps a target resource of a first mechanism of a third terminal.

It should be noted that the target resource in this embodiment of this application includes at least one of the following: a resource selection time and a selectable range of the resource selection time; and the second mechanism includes the active time and an inactive time.

According to the terminal in this embodiment of this application, the configuration parameter of the target resource of the first mechanism of the first terminal may be configured such that the target resource of the first mechanism of the first terminal at least partially overlaps the active time of the second mechanism of the second terminal, the configuration parameter for the second mechanism of the first terminal may be further configured such that the active time of the second mechanism of the first terminal at least partially overlaps the target resource of the first mechanism of the third terminal, and the resource for transmission may be selected within the first time. This enables data or packets sent by the first terminal to arrive within active times of terminals communicating with the first terminal, and specifies an operation of the first terminal for a case that data or packets sent by the first terminal do not arrive within active times of terminals communicating with the first terminal. This guarantees reliability of sidelink services while achieving energy saving, and thus solves the problems of low reliability of sidelink services and high power consumption due to failure in processing transmissions or packets located at some specific times because DRX active times and sensing times are not aligned between terminals.

An embodiment of this application further provides a readable storage medium, where the readable storage medium stores a program or instructions, and when the program or instructions are executed by a processor, the processes of the embodiments of the foregoing transmission configuration method are implemented, with the same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the embodiments of the foregoing transmission configuration method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

Embodiments of this application have been described with reference to the accompanying drawings. However, this application is not limited to the foregoing specific implementations. These specific implementations are merely for illustration rather than limitation. Inspired by this application, persons of ordinary skill in the art may develop many other forms which do not depart from the essence of this application and the protection scope of the claims, and all such forms shall fall within the protection scope of this application.

What is claimed is:

1. A transmission configuration method, comprising:

performing, by a first terminal, a first operation; wherein the first operation comprises:

selecting a resource for transmission from a first time;

wherein the method further comprises:

in a case that a target resource of the first terminal and an active time of a second mechanism of a second terminal do not overlap at all, performing, by the first terminal, a second operation; wherein the second operation comprises:

triggering resource reselection; wherein the target resource comprises at least one of the following: a resource selection time and a selectable range of the resource selection time; and the second mechanism comprises the active time and an inactive time.

2. The method according to claim 1, wherein the first operation further comprises:

configuring a configuration parameter of the target resource of the first mechanism of the first terminal such that the target resource of the first mechanism of the first terminal at least partially overlaps the active time of the second mechanism of the second terminal;

wherein the configuring a configuration parameter of a target resource of a first mechanism of the first terminal comprises at least one of the following:

configuring a starting point of the target resource to be no later than an ending point of the active time of the second mechanism of the second terminal; and configuring the starting point of the target resource to be no earlier than a starting point of the active time of the second mechanism of the second terminal.

3. The method according to claim 2, wherein the starting point of the target resource being no later than the ending point of the active time of the second mechanism of the second terminal comprises at least one of the following: the starting point of the target resource being no later than the starting point of the active time of the second mechanism of the second terminal, and the starting point of the target resource being located between the starting point and ending point of the active time of the second mechanism of the second terminal; and the starting point of the target resource being no earlier than the starting point of the active time of the second mechanism of the second terminal comprises at least one of the following: the ending point of the target resource being no earlier than the ending point of the active time of the second mechanism of the second terminal, and the ending point of the target resource being located between the starting point and ending point of the active time of the second mechanism of the second terminal.

4. The method according to claim 2, wherein the at least partially overlapping comprises at least one of the following:

length of an overlapping portion between the target resource and the active time of the second mechanism of the second terminal being greater than or equal to a first preset threshold;

a ratio of the overlapping portion between the target resource and the active time of the second mechanism of the second terminal to the target resource being greater than or equal to a second preset threshold;

a ratio of the overlapping portion between the target resource and the active time of the second mechanism of the second terminal to the active time being greater than or equal to a third preset threshold;

a ratio of the overlapping portion between the target resource and the active time of the second mechanism of the second terminal to a period of the second mechanism being greater than or equal to a fourth preset threshold;

length of an overlapping portion between the active time of the second mechanism of the first terminal and the target resource of the first mechanism of the third terminal being greater than or equal to a fifth preset threshold;

a ratio of the overlapping portion between the active time of the second mechanism of the first terminal and the target resource of the first mechanism of the third terminal to the target resource being greater than or equal to a sixth preset threshold;

a ratio of the overlapping portion between the active time of the second mechanism of the first terminal and the target resource of the first mechanism of the third terminal to the active time of the second mechanism of the first terminal being greater than or equal to a seventh preset threshold; and a ratio of the overlapping portion between the active time of the second mechanism of the first terminal and the target resource of the first mechanism of the third terminal to a period of the second mechanism of the first terminal being greater than or equal to an eighth preset threshold.

5. The method according to claim 1, wherein the selecting a resource for transmission from a first time comprises at least one of the following:

selecting a resource for initial transmission from a second time; and selecting a resource for retransmission from a third time; wherein the second time is an overlapping portion between the target resource of the first mechanism of the first terminal and the active time of the second mechanism of the second terminal, and the third time is a non-overlapping portion between the target resource of the first mechanism of the first terminal and the active time of the second mechanism of the second terminal; and the first time comprises the second time and the third time.

6. The method according to claim 1, wherein the selecting a resource for transmission from a first time comprises at least one of the following:

selecting a resource for initial transmission from a fourth time; and selecting a resource for retransmission from a fifth time; wherein the fourth time is an interval from a starting point of the target resource to a first time point, and the fifth time is an interval from a second time point to an ending point of the target resource; the first time point being a result of an ending point of the active time of the second mechanism of the second terminal minus the product of Land a ninth preset threshold, the second time point being a result of the ending time point of the active time of the second mechanism of the second terminal minus the product of L and the ninth preset threshold and plus an offset value, and L being an integer greater than or equal to 1; and the first time comprises the fourth time and the fifth time.

7. The method according to claim 5, wherein a manner of selecting the resource for initial transmission by the first terminal is different from a manner of selecting the resource for retransmission by the first terminal.

8. The method according to claim 1, wherein the second operation further comprises at least one of the following:

skipping transmission within the target resource;

skipping sensing within a sensing time corresponding to the target resource;

triggering resource selection;

triggering radio resource control (RRC) connection reconfiguration;

triggering RRC reconnection; and triggering a report operation.

9. The method according to claim 2, wherein a first object related to the first terminal is located within the active time of the second mechanism of the second terminal or a sensing time of the first mechanism of the third terminal; wherein the first object comprises at least one of the following: the target resource of the first terminal, a triggering time point of resource selection and a starting point of the selectable range of the resource selection time, a triggering time point of resource reselection and a starting point of the selectable range of the resource selection time, a triggering time point of resource selection and an ending point of the selectable range of the resource selection time, a triggering time point of resource reselection and an ending point of the selectable range of the resource selection time, a candidate resource, first-stage sidelink control information SCI, and second-stage SCI; wherein the first-stage SCI is related to the second-stage SCI.

10. The method according to claim 2, wherein the method further comprises:

performing, by the first terminal, transmission within the active time of the second mechanism of the second terminal or within a sensing time of the first mechanism of the third terminal.

11. The method according to claim 1, wherein the first operation further comprises configuring a configuration parameter for a second mechanism of the first terminal such that an active time of the second mechanism of the first terminal at least partially overlaps a target resource of a first mechanism of a third terminal, the first terminal configures the configuration parameter for the second mechanism of the first terminal in at least one of the following manners such that the active time of the second mechanism of the first terminal at least partially overlaps the target resource of the first mechanism of the third terminal:

being configured by a network-side device, being preconfigured, being indicated by another terminal, being prescribed by a protocol, and being determined by the first terminal.

12. The method according to claim 1, wherein the first operation further comprises configuring a configuration parameter for a second mechanism of the first terminal such that an active time of the second mechanism of the first terminal at least partially overlaps a target resource of a first mechanism of a third terminal, that the first terminal configures the configuration parameter for the second mechanism such that the active time of the second mechanism of the first terminal at least partially overlaps the target resource of the first mechanism of the third terminal comprises at least one of the following:

configuring, by the first terminal, the configuration parameter for the second mechanism by using first indication information such that the active time of the second mechanism of the first terminal at least partially overlaps the target resource of the first mechanism of the third terminal, wherein the first indication information is sent by the third terminal;

configuring, by the first terminal, the configuration parameter for the second mechanism of the first terminal based on a received packet such that the active time of the second mechanism of the first terminal at least partially overlaps the target resource of the first mechanism of the third terminal; and notifying, by the first terminal, a model for the first mechanism of the first terminal to the third terminal.

13. The method according to claim 1, wherein the second mechanism has a timer with a variable starting point or length, wherein that the second mechanism has a timer with a variable starting point or length comprises at least one of the following:

the starting point of the timer being related to a resource reselection time;

an ending point of the timer being related to a resource reselection time;

the starting point of the timer being related to a resource preemption time;

the ending point of the timer being related to a resource preemption time;

the starting point of the timer being related to a resource exclusion time;

the ending point of the timer being related to a resource exclusion time; and the length of the timer being related to a ninth preset threshold, wherein the ninth preset threshold comprises at least one of the following: a first interval between feedback information and corresponding data, a processing latency of the feedback information, and a sum of the first interval and the processing latency; wherein the feedback information is related to a transmission packet.

14. The method according to claim 13, wherein the processing latency comprises at least one of the following: a maximum value of the processing latency and a minimum value of the processing latency; or, wherein the sum of the first interval and the processing latency comprises at least one of the following:

a sum of the first interval and a maximum value of the processing latency;

a sum of the first interval and a minimum value of the processing latency;

a minimum value of the sum of the first interval and the processing latency; and a maximum value of the sum of the first interval and the processing latency.

15. The method according to claim 12, wherein the configuring, by the first terminal, the configuration parameter for the second mechanism by using first indication information comprises at least one of the following:

setting, by the first terminal, a period of the second mechanism of the first terminal to a multiple or factor of a service period of the third terminal indicated by the first indication information;

setting, by the first terminal, length of the active time of the second mechanism of the first terminal to length of a selectable range of a resource selection window; wherein the first indication information is used to indicate at least one of the following: distance between a triggering time point of resource selection of the third terminal and a starting point of the selectable range of the resource selection time, distance between a triggering time point of resource reselection of the third terminal and the starting point of the selectable range of the resource selection time, distance between the triggering time point of resource selection of the third terminal and an ending point of the selectable range of the resource selection time, and distance between the triggering time point of resource reselection of the third terminal and the ending point of the selectable range of the resource selection time; and configuring, by the first terminal, the configuration parameter for the second mechanism of the first terminal according to configuration information of a second mechanism indicated by the first indication information, wherein the second mechanism is a second mechanism desired by the third terminal or a second mechanism coordinated with service of the third terminal, wherein the first indication information is further used to indicate at least one of the following information: whether to extend the active time of the second mechanism of the first terminal, whether to trigger a timer of the second mechanism of the first terminal, an extended amount of the active time of the second mechanism of the first terminal, and length of the timer of the second mechanism of the first terminal.

16. The method according to claim 12, wherein the configuring, by the first terminal, the configuration parameter for the second mechanism of the first terminal based on a received packet comprises at least one of the following:

determining, by the first terminal based on a demodulation result of the received packet or HARQ-ACK information corresponding to the packet, whether to extend the active time of the second mechanism of the first terminal;

determining, by the first terminal based on the demodulation result of the received packet or the HARQ-ACK information corresponding to the packet, whether to trigger a timer of the second mechanism of the first terminal;

determining, by the first terminal based on distance between a reception time of the packet and an ending point of the active time of the second mechanism of the first terminal, whether to extend the active time of the second mechanism of the first terminal;

determining, by the first terminal based on the distance between the reception time of the packet and the ending point of the active time of the second mechanism of the first terminal, whether to trigger the timer of the second mechanism of the first terminal;

determining, by the first terminal based on distance between the reception time of the packet and a starting point of the inactive time of the second mechanism of the first terminal, whether to extend the active time of the second mechanism of the first terminal;

determining, by the first terminal based on the distance between the reception time of the packet and the starting point of the inactive time of the second mechanism of the first terminal, whether to trigger the timer of the second mechanism of the first terminal;

in a case that the first terminal discovers that a second object is located within the inactive time of the second mechanism of the first terminal, performing, by the first terminal, a first target operation; and in a case that the first terminal discovers that the second object is located within the active time of the second mechanism of the first terminal, performing, by the first terminal, a second target operation; wherein the second object is a transmission or transmission resource desired by the first terminal.

17. The method according to claim 16, wherein the second object is related to an aperiodic indication;

or, wherein the extending the active time of the second mechanism of the first terminal comprises at least one of the following: starting extending the active time of the second mechanism of the first terminal at a reception time of second indication information, starting extending the active time of the second mechanism of the first terminal at the reception time of the packet, starting extending the active time of the second mechanism of the first terminal at a reception failure time of the packet, starting extending the active time of the second mechanism of the first terminal at a transmission failure time of the packet, and starting extending the active time of the second mechanism of the first terminal at a demodulation failure time of the packet; and the triggering the timer of the second mechanism of the first terminal comprises at least one of the following: starting triggering the timer of the second mechanism of the first terminal at the reception time of the second indication information, starting triggering the timer of the second mechanism of the first terminal at the reception time of the packet, starting triggering the timer of the second mechanism of the first terminal at the reception failure time of the packet, starting triggering the timer of the second mechanism of the first terminal at the transmission failure time of the packet, and starting triggering the timer of the second mechanism of the first terminal at the demodulation failure time of the packet;

or, wherein the determining, by the first terminal based on a demodulation result of the received packet or HARQ-ACK information corresponding to the packet, whether to extend the active time of the second mechanism of the first terminal or whether to trigger a timer of the second mechanism of the first terminal comprises at least one of the following:

in a case that the first terminal fails to demodulate the received packet, extending the active time of the second mechanism of the first terminal;

in a case that the first terminal fails to demodulate the received packet, triggering the timer of the second mechanism of the first terminal;

in a case that the HARQ-ACK information corresponding to the packet received by the first terminal is NACK, extending the active time of the second mechanism of the first terminal;

in a case that the HARQ-ACK information corresponding to the packet received by the first terminal is NACK, triggering the timer of the second mechanism of the first terminal;

in a case that the first terminal successfully demodulates the received data packet, skipping extending the active time of the second mechanism of the first terminal;

in a case that the first terminal successfully demodulates the received data packet, skipping triggering the timer of the second mechanism of the first terminal;

in a case that the HARQ-ACK information corresponding to the data packet received by the first terminal is ACK, skipping extending the active time of the second mechanism of the first terminal; and in a case that the HARQ-ACK information corresponding to the data packet received by the first terminal is ACK, skipping triggering the timer of the second mechanism of the first terminal.

18. The method according to claim 16, wherein the determining, by the first terminal based on distance between a reception time of the data packet and an ending point of the active time of the second mechanism of the first terminal, whether to extend the active time of the second mechanism of the first terminal or whether to trigger the timer of the second mechanism of the first terminal comprises:

in a case that the distance between the reception time of the packet and the ending point of the active time of the second mechanism of the first terminal is less than a tenth preset threshold, extending, by the first terminal, the active time of the second mechanism of the first terminal or triggering the timer of the second mechanism of the first terminal; and in a case that the distance between the reception time of the packet and the ending point of the active time of the second mechanism of the first terminal is greater than or equal to the tenth preset threshold, skipping extending, by the first terminal, the active time of the second mechanism of the first terminal or determining to skip triggering the timer of the second mechanism of the first terminal;

or, wherein the determining, by the first terminal based on distance between the reception time of the packet and a starting point of the inactive time of the second mechanism of the first terminal, whether to extend the active time of the second mechanism of the first terminal or whether to trigger the timer of the second mechanism of the first terminal comprises:

in a case that the distance between the reception time of the packet and the starting point of the inactive time of the second mechanism of the first terminal is less than an eleventh preset threshold, extending, by the first terminal, the active time of the second mechanism of the first terminal or triggering the timer of the second mechanism; and in a case that the distance between the reception time of the packet and the starting point of the inactive time of the second mechanism is greater than or equal to the eleventh preset threshold, skipping extending, by the first terminal, the active time of the second mechanism of the first terminal or determining to skip triggering the timer of the second mechanism of the first terminal, wherein the packet comprises one of the following: a packet related to initial transmission and a packet related to retransmission.

19. The method according to claim 1, wherein the method further comprises:

in case of resource exclusion, excluding, by the first terminal, a resource that is not within the active time of the second mechanism of the second terminal; or in case of selecting a transmission resource, selecting, by the first terminal, a resource that is located within the active time of the second mechanism of the second terminal; or, wherein the method further comprises at least one of the following:

in case of groupcast or broadcast communication, configuring, by the first terminal, the configuration parameter of the target resource of the first mechanism of the first terminal;

in case of unicast communication, configuring, by the first terminal, the configuration parameter for the second mechanism of the first terminal;

demodulating, by the first terminal, a packet received outside the active time of the second mechanism of the first terminal or during the inactive time of the second mechanism of the first terminal;

skipping demodulating, by the first terminal, a packet received outside the active time of the second mechanism of the first terminal or during the inactive time of the second mechanism of the first terminal.

20. A terminal comprising a processor, a memory, and a program or instructions stored in the memory and capable of running on the processor, wherein the program or instructions, when executed by the processor, causes the processor to perform a first operation; wherein the first operation comprises:

selecting a resource for transmission from a first time; and wherein the program or instructions, when executed by the processor, causes the processor to further perform the following:

in a case that a target resource of the first terminal and an active time of a second mechanism of a second terminal do not overlap at all, performing a second operation; wherein the second operation comprises:

triggering resource reselection; wherein the target resource comprises at least one of the following: a resource selection time and a selectable range of the resource selection time; and the second mechanism comprises the active time and an inactive time.

* * * * *